US012424210B2

(12) United States Patent
Fan et al.

(10) Patent No.: US 12,424,210 B2
(45) Date of Patent: Sep. 23, 2025

(54) NATURAL LANGUAGE PROCESSING

(71) Applicant: Amazon Technologies, Inc., Seattle, WA (US)

(72) Inventors: Xing Fan, Redmond, WA (US); Chenlei Guo, Redmond, WA (US); Narendra Gyanchandani, Sammamish, WA (US); Hyungseo Park, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 221 days.

(21) Appl. No.: 18/456,949

(22) Filed: Aug. 28, 2023

(65) Prior Publication Data

US 2025/0078823 A1  Mar. 6, 2025

(51) Int. Cl.
  *G10L 15/183*  (2013.01)
  *G10L 15/22*  (2006.01)
  *G10L 15/30*  (2013.01)

(52) U.S. Cl.
  CPC .......... *G10L 15/183* (2013.01); *G10L 15/22* (2013.01); *G10L 2015/223* (2013.01); *G10L 15/30* (2013.01)

(58) Field of Classification Search
  USPC ...................................... 704/1–504
  See application file for complete search history.

(56) References Cited

U.S. PATENT DOCUMENTS

| 11,455,998 | B1 * | 9/2022 | Nadig ............... G10L 15/22 |
| 11,645,468 | B2 * | 5/2023 | Xu ............... G06F 40/295 |
| | | | 704/9 |
| 11,775,891 | B2 * | 10/2023 | Brown ............... G06F 16/9535 |
| | | | 705/7.12 |
| 11,977,854 | B2 * | 5/2024 | Tunstall-Pedoe .... G06N 3/0442 |

(Continued)

FOREIGN PATENT DOCUMENTS

| WO | WO-2023161630 A1 * | 8/2023 | .......... G06F 40/279 |
| WO | WO-2024201036 A1 * | 10/2024 | |
| WO | WO-2025071899 A1 * | 4/2025 | .......... G10L 13/047 |

OTHER PUBLICATIONS

International Search Report and Written Opinion mailed on May 27, 2024 for International Patent Application No. PCT/US2024/014183, filed Feb. 2, 2024, 17 pages.

(Continued)

*Primary Examiner* — Marcus T Riley
(74) *Attorney, Agent, or Firm* — Pierce Atwood LLP

(57) ABSTRACT

Techniques for determining one or more responses associated with one or more components that are responsive to a user input are described. The system receives a user input and causes one or more components to generate one or more responses associated with the user input. The system determines one or more of the responses are responsive to the user input, causes one or more actions associated with the responses to be performed, and outputs a natural language summary of the one or more responses. If the system determines that none of the responses are responsive to the user input and/or an ambiguity exists with respect to the user (Continued)

input, the system can generate a request for additional information usable to resolve the ambiguity, which may be sent to another component of the system and/or output to the user that provided the user input.

20 Claims, 11 Drawing Sheets

(56) References Cited

U.S. PATENT DOCUMENTS

| | | | | |
|---|---|---|---|---|
| 11,989,507 | B2* | 5/2024 | Tunstall-Pedoe | G06F 40/20 |
| 11,989,527 | B2* | 5/2024 | Tunstall-Pedoe | G06F 40/35 |
| 11,990,122 | B2* | 5/2024 | Sarikaya | G10L 13/08 |
| 11,996,081 | B2* | 5/2024 | Radostev | G10L 15/083 |
| 12,069,013 | B1* | 8/2024 | Bell | H04L 51/046 |
| 12,217,009 | B2* | 2/2025 | Tunstall-Pedoe | G06N 3/08 |
| 12,315,507 | B1* | 5/2025 | Filimonov | G10L 15/22 |
| 2023/0120966 | A1* | 4/2023 | Nadig | H04L 67/306 |
| | | | | 704/275 |
| 2023/0259705 | A1* | 8/2023 | Tunstall-Pedoe | G06N 3/0499 |
| | | | | 704/9 |
| 2023/0274086 | A1* | 8/2023 | Tunstall-Pedoe | G06F 40/20 |
| | | | | 704/9 |
| 2023/0274089 | A1* | 8/2023 | Tunstall-Pedoe | G06F 40/40 |
| | | | | 704/2 |
| 2023/0274094 | A1* | 8/2023 | Tunstall-Pedoe | G06F 40/30 |
| | | | | 704/9 |
| 2023/0316006 | A1* | 10/2023 | Tunstall-Pedoe | G06N 3/0442 |
| | | | | 704/9 |
| 2024/0029708 | A1* | 1/2024 | Radostev | G10L 15/22 |
| 2024/0321261 | A1* | 9/2024 | Radostev | G10L 15/1822 |
| 2024/0412720 | A1* | 12/2024 | Vasylyev | G06F 16/90332 |
| 2025/0036868 | A1* | 1/2025 | Tunstall-Pedoe | G06F 16/3344 |
| 2025/0045520 | A1* | 2/2025 | Tunstall-Pedoe | G06F 40/20 |
| 2025/0078823 | A1* | 3/2025 | Fan | G06F 40/35 |

OTHER PUBLICATIONS

Evan King et al. "Sasha: Creative Goal-Oriented Reasoning in Smart Homes with Large Language Models," https://arxiv.org/abs/2305.09802v3, 38 pages.

Evan King et al., "Get ready for a party: Exploring smarter smart spaces with help from large language models," https://arxiv.org/abs/2303.14143, 7 pages.

Wenlong Huang, et al. "Inner Monologue: Embodied Reasoning through Planing with Language Models," https://arxiv.org/abs/2207.05608v1, 25 pages.

Grégoire Mialon, et al. "Augmented Language Models: a Survey," https://arxiv.org/abs/2302.07842v1, 33 pages.

* cited by examiner

NATURAL LANGUAGE PROCESSING

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Such processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
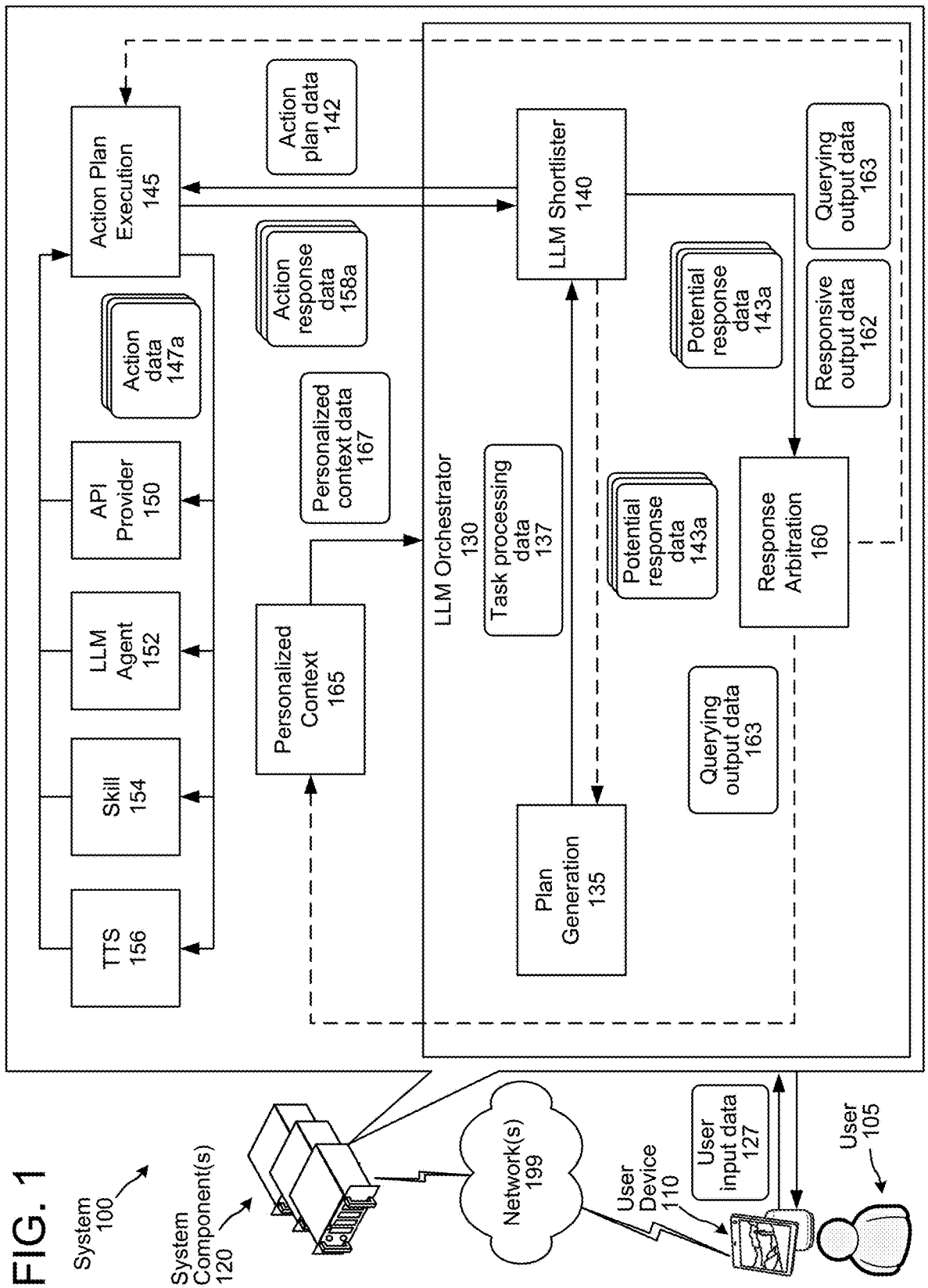
FIG. 1 is a conceptual diagram illustrating example components and processing for determining one or more components configured to perform an action associated with the task, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech. Natural language generation (NLG) is a field of artificial intelligence concerned with automatically transforming data into natural language (e.g., English) content. Language modeling (LM) is the use of various statistical and probabilistic techniques to determine the probability of a given sequence of words occurring in a sentence.

Certain systems may be configured to respond to natural language (e.g., spoken or typed) user inputs. For example, in response to the user input "what is today's weather," the system may output weather information for the user's geographic location. As another example, in response to the user input "what are today's top stories," the system may output one or more news stories. For further example, in response to the user input "tell me a joke," the system may output a joke to the user. As another example, in response to the user input "book me a flight to Seattle," the system may book a flight to Seattle and output information of the booked flight. For further example, in response to the user input "lock the front door," the system may actuate a "front door" smart lock to a locked position.

A system may receive a user input as speech. For example, a user may speak an input to a device. The device may send audio data, representing the spoken input, to the system. The system may perform ASR processing on the audio data to generate ASR data (e.g., text data, token data, etc.) representing the user input. The system may perform processing on the ASR data to determine an action responsive to the user input.

In some instances, the system may be configured to process the ASR data using one or more language models (e.g., one or more large language models (LLMs)) to determine one or more components configured to perform one or more functions potentially responsive to the user input (e.g., generate a potential response/action responsive to the user input). For example, in response to the user input "Please plan a 4-person trip to [Location] from [Date 1] to [Date 2]," the language model(s) may determine one or more components (e.g., an API, a skill component, a LLM agent component, etc.) configured to book a flight ticket and book a hotel. To select one or more of the components to respond to the user input, the system may request data from the one or more components including a potential response to the user input. The potential response may include natural language data that may be used to respond to the user input. The potential response may also or instead include a description of a potential action the component is configured to/will perform with respect to the user input.

The language model(s) may process the data returned from the components to determine whether the potential responses are responsive to the user input. If one or more of the potential responses are responsive to the user input, the system may select more than one of the potential responses to output or may generate a summary of the selected potential responses (e.g., for a given user input of "what is the capital of France," if the selected potential responses are "the capital of France is Paris" and "Paris became the capital of France in 987" the system may output "the capital of France is Paris," "Paris became the capital of France in 987" or a summary of the selected responses: "Paris has been the capital of France since 987").

In instances where one or more of the selected potential responses include a description of a potential action, the system may further cause the corresponding component(s) to perform the corresponding action(s) (e.g., for a given user input of "please turn on the light," if a selected potential response includes a potential action of a first component turning on a first light, the system will further cause the first component to turn on the first light). In some embodiments, the system may cause the component(s) corresponding to the selected response(s) to perform the corresponding action(s) prior to outputting natural language data to the user (e.g., for the given user input of "Please turn on the light" and the abovementioned selected response, the system may first cause the first component to turn on the first light and may then present a natural language output "The light is on" via a device display and/or synthesized speech).

If the potential responses are not responsive to the user input and/or the system determines an ambiguity exists with respect to the user input, then the system may send a request for additional information usable to resolve the ambiguity. The request for additional information may be presented to the user and/or to a component configured to determine the additional information. For example, for a user input "book a flight to [destination]" the system may determine that an originating location is not included in the user input, and may therefore request such information from a component (e.g., context data representing the user's current location or the user's home location) or may request such information from the user.

The present disclosure provides techniques for using one or more language models to select from one or more potential responses provided by one or more different types of components. The system is configured to receive and process potential responses from different types of components, such as APIs, skill components, and LLM-based agent components in order to perform an action responsive to the user input. The system may process to determine one or more components configured to generate responses associated with a user request, and receive, from the one or more components, potential responses from the components. The system may process the potential responses, as well as contextual information associated with the user input, to select one or more of the potential responses that are responsive to the user request. In some cases, the system may generate a summary of the one or more selected responses and/or, if the one or more selected responses include a potential action(s), cause the potential action(s) to be performed by the corresponding components. For example, in response to receiving a user input of "What is the weather for today," the system may process to determine one or more components configured to generate potential responses associated with the user input (e.g., weather skill components, LLM agents finetuned for weather inquiries) and receive, from the one or more components, a potential response of "It is currently 70 degrees, with a high of 75 and a low of 68" from a first component and a potential response of "The weather for today is expected to be mostly sunny, but with a chance of rain in the late afternoon" from a second component. The system may determine that the potential responses from both components are responsive to the user input and generate a summary of the responses such as "It is expected to be mostly sunny today, with a high of 75 and a low of 68, but with a chance of rain in the late afternoon," which may be output to the user (e.g., as audio or visual information). For further example, in response to receiving a user input of "Please turn on the outside lights," the system may process to determine one or more components configured to generate potential responses associated with the user input (e.g., device control components, LLM agents, etc.) and receive, from the one or more components, a potential action of "Turn on porch light A" from a first component, a potential action of "turn on garage light B" from a second component, and a potential action of "turn on hallway light C" from a third component. The system may determine that the responses from the first and second components are responsive to the user input and cause the first and second component to perform the corresponding actions (e.g., turn on porch light A and garage light B). The system may further output a summary of the selected responses to the user input of "The porch light and the garage light are now on." As another example, in response to the user input "Please plan a 4-person trip to [Location] from [Date 1] to [Date 2]," the system may determine one or more components (e.g., travel skill components, LLM agents finetuned for travel inquiries, etc.) configured to generate potential responses associated with the user input (e.g., booking a flight ticket and booking a hotel) and receive, from the one or more components, potential responses including a potential action of "book flight ticket for flight [flight number] through [airline company name] on [Date 1]" from a first component and a potential action of "book a hotel room at [Hotel company name] in [Location] from [Date 1] to [Date 1]" from a second component. The system may determine that the potential responses from the first component and the second component are responsive to the user input and may generate a summary of the selected responses of "I found flight [flight number] to [Location] through [airline company] on [Date 1] and a hotel room at [Hotel company name] from [Date 1] to [Date 2], want me to book them?" to be output to the user. The system may further cause the first component and the second component to perform the actions (e.g., booking the identified flight and hotel), for example, in response to the user authorizing the system to do so.

If the system determines that none of the potential responses are responsive to the user input and/or an ambiguity exists with respect to the user request, the system may generate a request for additional information usable to resolve the ambiguity and/or perform the action responsive to the user request. The request for additional information may be output to a user and/or sent to another component of the system, which may return various user-specific information associated with the user, including dialog information (e.g., one or more previous user inputs and/or system-generated responses for a current interaction between the user and the system), user preferences, and user behavior information (e.g., information one or more typical behaviors associated with the user (e.g., user turns the outside lights on after 7 PM, user prefers [music streaming service 1], etc.). The system may use the additional information to resolve any ambiguities in the user request, arbitrate between the potential responses (and/or further responses generated based on the additional information) to select one or more of the potential responses that are responsive to the user input, and present an output corresponding to one or more selected responses and/or cause one or more components to perform the corresponding action(s).

Teachings of the present disclosure provide, among other things, an improved user experience by providing a system capable of selecting between potential responses (natural language data and/or actions) determined by various components. The various components include different types of components such as API components, skill components, LLM-based agents, and others. Techniques of the present disclosure allow the system to respond to a user input using multiple different type of components, rather than being limited to a single type of component. Additionally, the system is enabled to respond using potential responses/ actions from more than one component (e.g., by combining or summarizing selected responses from two LLM-based agents, or an LLM-based agent and a skill component, etc.). The system can use the selected responses (or portions of the selected responses) from multiple components to respond to the user input. Thereafter, in the instance where one or more of the selected responses include a potential action to be performed, the system may cause the corresponding component to perform the action.

A system according to the present disclosure will ordinarily be configured to incorporate user permissions and only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 illustrates a system 100 for using one or more language models to determine an action responsive to a user input. As shown in FIG. 1, the system may include a user device 110, local to a user 105, in communication with a system component(s) 120 via a network(s) 199. The network(s) 199 may include the Internet and/or any other wide- or local-area network, and may include wired, wireless, and/or cellular network hardware.

The system component(s) 120 may include various components, such as a large language model (LLM) orchestrator component 130, a personalized context component 165, an action plan execution component 145, an API provider component 150, an LLM agent component 152, a skill component 154, and a TTS component 156. The LLM orchestrator component 130 may include a plan generation component 135, an LLM shortlister component 140, and a response arbitration component 160. In some embodiments, the response arbitration component 160 may exist elsewhere in the system component(s) 120 outside of the LLM orchestrator component 130.

Language modeling (LM) is the use of various statistical and probabilistic techniques to determine the probability of a given sequence of words occurring in a sentence. Language models analyze bodies of text data to provide a basis for their word predictions. The language models are generative models. In some embodiments, the language models may be a LLM. An LLM is an advanced artificial intelligence system designed to process, understand, and generate human-like text based on massive amounts of data. In some embodiments, an LLM may be further designed to process, understand, and generate multi-modal data including audio, text, image, and/or video. An LLM model may be built using deep learning techniques, such as neural networks, and may be trained on extensive datasets that include text (or other type of data, such as multi-modal data including text, audio, image, video, etc.) from a broad range of sources, such as books and websites, for natural language processing. An LLM uses an expansive training dataset, as compared to a language model, and can include a large number of parameters (in the range of billions), hence, they are called "large" language models. In some embodiments one or more of the language models (and their corresponding operations, discussed herein below) may be the same language model.

In some embodiments where one or more of the language models are LLMs, the one or more language model may be transformer-based seq2seq models involving an encoder-decoder architecture. In an encoder-decoder architecture, the encoder may produce a representation of an input (e.g., audio, text, image, video, etc.) using a bidirectional encoding, and the decoder may use that representation to perform some task. In some such embodiments, one or more of the language model may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the language model may be pre-trained for approximately 1 trillion tokens. Being trained on CLM tasks, the one or more language models may be capable of in-context learning. An example of such a LLM is Alexa Teacher Model (Alexa TM).

In other embodiments, where one or more of the language models are an LLM, the one or more language models may be a decoder-only architecture. The decoder-only architecture may use left-to-right (unidirectional) encoding of the input (e.g., audio, text, image, video, etc.). An example of such a LLM is the Generative Pre-trained Transformer 3 (GPT-3) and other versions of GPT. GPT-3 has a capacity of (approximately) 175 billion machine learning parameters.

Other examples of LLMs include BigScience Large Open-science Open-access Multilingual Language Model (BLOOM), Language Model for Dialogue Applications model (LaMDA), Bard, Large Language Model Meta AI (LLaMA), Titan Foundational Model, etc.

In some embodiments, the system may include one or more machine learning model(s) other than one or more of the language models. Such machine learning model(s) may receive text and/or other types of data as inputs (e.g., audio, image, video, etc.), and may output text and/or the other types of data. Such model(s) may be neural network-based models, deep learning models, classifier models, autoregressive models, seq2seq models, etc.

In embodiments where one or more of the language models are an LLM, the input to the LLM may be in the form of a prompt. A prompt may be a natural language input, for example, an instruction, for the LLM to generate an output according to the prompt. The output generated by the LLM may be a natural language output responsive to the prompt. In some embodiments, the output may be another type of data, such as audio, image, video, etc. The prompt and the output may be text in a particular language (e.g., English, Spanish, German, etc.) and/or other types of data such as audio, image, video, etc. For example, for an example prompt "how do I cook rice?", the LLM may output a recipe (e.g., a step-by-step process represented by text, audio, image, video, etc.) to cook rice. As another example, for an example prompt "I am hungry. What restaurants in the area are open?", the LLM may output a list of restaurants near the user 105 that are open at the time.

The language models may be configured using various learning techniques. For example, in some embodiments, the language models may be configured using few-shot learning. In few-shot learning, the model learns how to learn to solve the given problem. In this approach, the model is provided with a limited number of examples (i.e., "few shots") from the new task, and the model uses this information to adapt and perform well on that task. Few-shot learning may require fewer amount of training data than implementing other fine-tuning techniques. For further example, in some embodiments, the language models may be configured using one-shot learning, which is similar to few-shot learning, except the model is provided with a single example. As another example, in some embodiments, the language models may be configured using zero-shot learning. In zero-shot learning, the model solves the given problem without examples of how to solve the specific/similar problem and just based on the model's training dataset. In this approach, the model is provided with data sampled from a class not observed during training, and the model learns to classify the data.

In some embodiments, the LLM orchestrator component 130 may generate prompt data representing a prompt for input to the language models. As shown in FIG. 1, the system component(s) 120 receive user input data 127, which may be provided to the LLM orchestrator component 130. In some instances, the user input data 127 may correspond to various data types, such as text (e.g., a text or tokenized representation of a user input), audio, image, video etc. For example, the user input data may include input text (or tokenized) data when the user input is a typed natural language user input. For further example, prior to the LLM orchestrator component 130 receiving the user input data 127, another component (e.g., an automatic speech recognition (ASR) component 650) of the system 100 may receive audio data representing the user input. The ASR component 650 may perform ASR processing on the audio data to determine ASR data corresponding to the user input, which may correspond to a transcript of the user input. As described below, with respect to FIG. 6, the ASR component 650 may determine ASR data that includes an ASR N-best list including multiple ASR hypotheses and corresponding confidence scores representing what the user may have said. The ASR hypotheses may include text data, token data, ASR confidence score, etc. as representing the input utterance. The confidence score of each ASR hypothesis may indicate the ASR component's 650 level of confidence that the corresponding hypothesis represents what the user said. The ASR component 650 may also determine token scores corresponding to each token/word of the ASR hypothesis, where the token score indicates the ASR component's 650 level of confidence that the respective token/word was spoken by the user. The token scores may be identified as an entity score when the corresponding token relates to an entity. In some instances, the user input data 127 may include a top scoring ASR hypothesis of the ASR data. As an even further example, in some embodiments, the user input may correspond to an actuation of a physical button, data representing selection of a button displayed on a graphical user interface (GUI), image data of a gesture user input, combination of different types of user inputs (e.g., gesture and button actuation), etc. In such embodiments, the system 100 may include one or more components configured to process such user inputs to generate the text or tokenized representation of the user input (e.g., the user input data 127).

The user input data 127 may be received at the LLM orchestrator component 130 of the system component(s) 120, which may be configured to generate a list (e.g., one or more) of tasks (e.g., steps/actions) that are to be completed in order to perform an action responsive to the user input and select a task of the list of the tasks that is to be completed first (e.g., in a current iteration of processing by the system 100), as described in detail herein below with respect to FIG. 4. In instances where the plan generation component 135 generates more than one task to be completed in order to perform the action responsive to the user input, the plan generation component 135 may further maintain and prioritize the list of tasks as the processing of the system 100 with respect to the user input is performed. In other words, as the system 100 processes to complete the list of tasks, the plan generation component 135 may (1) incorporate the potential responses associated with completed tasks into data provided to other components of the system 100; (2) update the list of tasks to indicate completed (or attempted, in-progress, etc.) tasks; (3) generate an updated prioritization of the tasks remaining to be completed (or tasks to be attempted again); and/or (4) determine an updated current task to be completed. The plan generation component 135 may generate and send task processing data 137 representing the selected task to be completed and various other information needed to perform further processing with respect to the task (e.g., the user input data 127, an indication of the selected task, potential responses associated with previous tasks, the remaining task(s), and context data associated with the user input data 127, as described in detail herein below with respect to FIG. 4) to the LLM shortlister component 140.

The LLM shortlister component 140 may be configured to determine one or more components (e.g., APIs, skill component(s) 154, LLM agent component(s) 152, TTS component 156, etc.) configured to perform an action related to the user input or the current task. The LLM shortlister component 140 may further be configured to generate and cause the execution of a request(s) (e.g., an API call(s), an incomplete API call/API call format, an indication of an action to be performed by a component, etc.) for the one or more components to provide a potential responses(s) to the user input or current task (e.g., a response to a user-provided question, a paragraph from a website, etc.), which may further include a potential action (e.g., a description of a potential action, such as turning on a light, booking a flight ticket, ordering a pizza, etc.) the components are configured to/will perform with respect to the user input or the current task). Such requests may be represented in the action plan data 142 sent to the action plan execution component 145. The action plan execution component 145 may identify the request(s) in the action plan data 142, generate executable API calls corresponding to the request(s), and cause the corresponding components (e.g., the API provider component 150, the LLM agent component 152, the skill component 154, and/or the TTS component 156) to generate action response data 158a-n representing the requested potential response(s), where individual action response data 158a may be provided by/correspond to a particular responding component—one of the API provider component 150, the LLM agent component 152, the skill component 154, and/or the TTS component 156. The action response data 158a-n may include various data types including audio, text, image, video, etc. In some embodiments, the action response data 158a-n may include an identifier (e.g., a component name, an alphanumerical value associated with the component, etc.) for the component providing the data. The LLM shortlister component 140 receives and processes the action response data 158a-n and generates potential response data 143a-n representing the potential response(s) (e.g., relevant potential responses, selected potential responses, ranked potential responses, etc.) for further processing (e.g., as described in detail herein below with respect to FIG. 5). If the LLM shortlister component 140 determines that there are no remaining tasks to generate potential responses for, the LLM shortlister component 140 may send the potential response data 143a-n to the response arbitration component 160.

The potential response data 143a-n, in some embodiments, may be determined based on receiving potential responses from various different components that may be relevant in responding to the user input data 127. For example, the potential response data 143a-n may include a first potential response from a first component configured to perform a first task determined by the plan generation component 135, a second potential response from a second component configured to perform a second task determined by the plan generation component 135, etc. The potential response data 143a-n can include more than one potential response relating to an individual task. In some embodiments, the potential response data 143a-n may be natural language data. In other embodiments, the potential response data 143a-n may be multi-modal data such as audio, image, text, video, etc.

The response arbitration component 160 processes the potential response data 143a-n to determine whether the potential responses generated for the one or more tasks are responsive to the user input. The response arbitration component 160 processes the potential response data 143a-n (representing at least the generated potential responses) and selects one or more of the potential responses that are determined to be responsive to the user input and/or determines that none of the actions are responsive to the user input. For example, the response arbitration component 160 may process the potential response data 143a-n to determine if one or more of the potential responses performable by the API(s) (e.g., the potential responses and/or potential actions) are responsive to the current task. In some embodiments, the response arbitration component 160 may generate a natural language summary of one or more of the selected responses and output the natural language summary to the user 105. In some embodiments, the response arbitration component 160 may further output other types of data to the user such as audio, image, video, etc. which may be included in/associated with the selected responses.

If the response arbitration component 160 determines that none of the potential responses are responsive to the user input, then the response arbitration component 160 may send an instruction to the personalized context component 165 to generate additional information (e.g., personalized context data 167) for the user input. Additionally, or alternatively, the response arbitration component 160 may generate a natural language question to be output to the user 105 requesting the additional information. In some embodiments, the response arbitration component 160 may further output other types of data to the user such as audio, image, video, etc. which may be included in/associated with the selected responses. In such instances, the system 100 (e.g., the plan generation component 135, the LLM shortlister component 140, and/or the response arbitration component 160) may process as described herein with further respect to the additional information (e.g., the personalized context data 167 and/or the user-provided additional information) to perform the action responsive to the user input.

Figure 2:
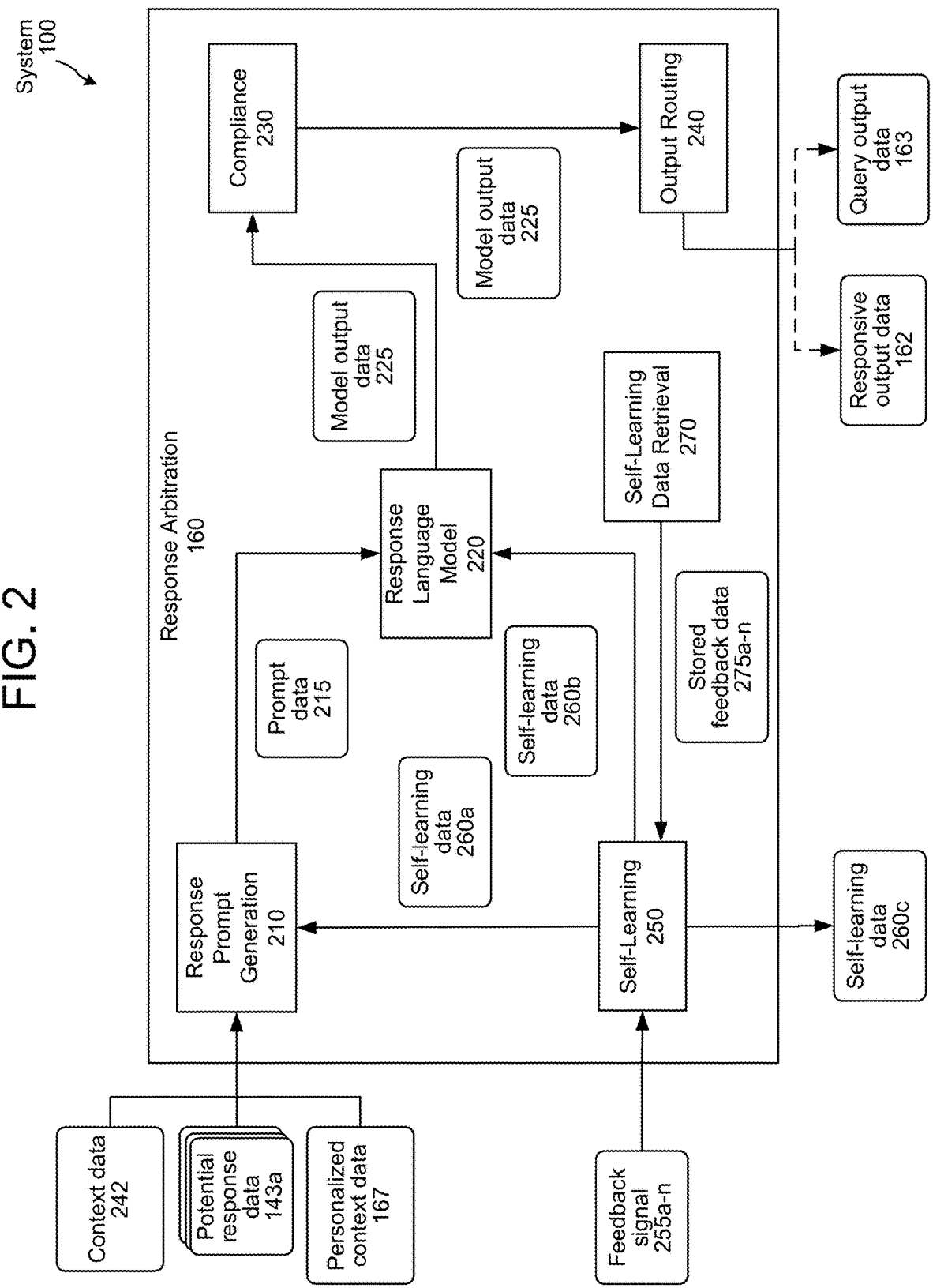
FIG. 2 is a conceptual diagram illustrating example components and processing of a response arbitration component, according to embodiments of the present disclosure.

FIG. 2 illustrates example components and processing of the response arbitration component 160. As shown in FIG. 2, the response arbitration component 160 may include a response prompt generation component 210, a response language model 220, a compliance component 230, an output routing component 240, a self-learning component 250, and a self-learning data retrieval component 270. As discussed herein above, the response arbitration component 160 processes the potential response data 143a-n (representing the potential responses generated by the one or more components determined to be associated with the user input) to determine whether one or more of the potential responses generated by the system 100 are responsive to the user input.

As shown in FIG. 2, the response arbitration component 160 receives the potential response data 143a-n (output by the LLM shortlister component 140) at the response prompt generation component 210. The response prompt generation component 210 may further receive personalized context data 167 (from the LLM shortlister component 140 or the personalized context component 165) and context data 242. In some embodiments, the context data 242 may correspond to various contextual information associated with the user input (e.g., dialog history data, historical user input data, weather data, time of day, user ID, device information associated with the device that sent the user input data 127 (e.g., device ID, device states, historical device interaction data, etc.), etc.). As discussed herein below, the response arbitration component 160 may further receive additional information from the LLM shortlister component 140, such as the potential responses of processing performed with respect to previous tasks (e.g., previous action response data) associated with the user input, and the user input data 127.

The personalized context data 167 may represent one or more contextual signals associated with the user 105, such as information associated with a user profile of the user 105 (e.g., user ID, user behavioral information, user preferences, age, gender, historical user interaction data, devices associated with the user profile, etc.), which may be determined using, for example, a user recognition component 695. In some embodiments, an indication of the user 105 and/or user profile may be included in the user input data 127 (e.g., as included in the output of the ASR component 650). In some embodiments, the personalized context data 167 may include dialog history data representing one or more user inputs and corresponding system-generated responses for a current interaction between the user 105 and the system 100.

As used herein, a "dialog" may refer to multiple related user inputs and system 100 outputs (e.g., through user device(s) 110) between the system and the user that may have originated with a single user input initiating the dialog. Thus, the data associated with a dialog may be associated with a same dialog identifier, which may be used by components of the overall system 100 to associate information across the dialog. Subsequent user inputs of the same dialog may or may not start with the user speaking a wakeword. Each natural language input may be associated with a different natural language input identifier, and each natural language input identifier may be associated with a corresponding dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The response prompt generation component 210 may process the potential response data 143a-n, context data 242, and the personalized context data 167 (and, optionally, the further information received from the LLM shortlister component 140) to generate prompt data 215 representing a prompt for input to the response language model 220. In some embodiments, the prompt data 215 may be an instruction for the response language model 220 to determine whether one or more of the potential responses represented in the potential response data 143a-n are responsive to the user input given the other information (e.g., the personalized context data 167, the context data 242, the potential responses associated with the previous tasks (e.g., previous action response data) associated with the user input, and the user input data 127) included in the prompt data 215. The prompt data may further be an instruction for the response language model 220 to, if the response language model 220 determines that one or more of the potential responses are responsive to the user input, cause performance of the one or more corresponding actions (e.g., the one or more potential actions included in the selected responses) and/or cause the system 100 to inform the user 105 of the one or more selected responses. For example, in some embodiments, prompt data 215 may further instruct the response language model 220 to generate a natural language summary of the one or more selected responses determined to be responsive to the user input. The prompt data 215 may instruct the response language model 220 to cause the system 100 to output the natural language summary to the user 105.

In some embodiments, the prompt data 215 may further be an instruction for the response language model 220 to, if the response language model 220 determines that none of the potential responses are responsive to the user input, generate a request for additional information from a component of the system 100 and/or the user 105. As discussed above, the additional information may be any information usable to determine and/or perform an action responsive to the user input (e.g., to resolve an ambiguity associated with the user input and/or a task(s) associated with the user input).

In some embodiments, the response prompt generation component 210 may also include in the prompt data 215 a sample processing format to be used by the response language model 220 when processing the prompt. In some embodiments, the response prompt generation component 210 may generate the prompt data 215 according to a template format. For example, the prompt data 215 may adhere to a template format including:

```
{
"You are a conversational AI agent that communicates with users
to satisfy their request or ask clarification questions. If applicable,
summarize the responses that satisfy the user's request. If
applicable, call the corresponding API's to perform the potential
actions that satisfy the user's request. If no response is needed,
indicate that."
Here is the user's request:
[user input data 127]
Here are the potential responses:
[potential response data 143a-n]
}
```

In some embodiments, the template format may instruct the response language model 220 as to how it should process to determine whether one or more of the potential responses are responsive to the user input. In some embodiments, the format may further include an indication, such as a label of "User:" indicating the following string of characters/tokens as the user input. In some embodiments, the format may further include a label of "Thought:" instructing the response language model 220 to generate an output representing whether one or more of the potential responses are determined to be responsive to the user input or whether additional information is needed. In some embodiments, the format may further include an indication of "Response:" instructing the response language model 220 to indicate the one or more selected responses determined to be responsive to the user input, generate a summary of the one or more selected responses, and/or generate a request for additional information.

Following such a template format, for example, and for the example user input of "What is the weather for today" and corresponding potential responses output by the LLM shortlister component 140, the response prompt generation component 210 may generate example prompt data 215*a*:

```
{
"You are a conversational AI agent that communicates with users
to satisfy their request or ask clarification questions. If no response
is needed, indicate that."
Here is the user's request:
What is the weather for today
Here are the potential responses and potential actions:
Skill component A: It is currently 70 degrees, with a high of 75
and a low of 68
Skill component B: The weather for today is expected to be mostly
sunny, but with a chance of rain in the late afternoon
}
```

For further example, and for the example user input of "please order some pizza for dinner" and corresponding potential responses output by the LLM shortlister component 140, the response prompt generation component 210 may generate example prompt data 215*b*:

```
{
"You are a conversational AI agent that communicates with users
to satisfy their request or ask clarification questions. If no response
is needed, indicate that."
Here is the user's request:
Please order some pizza for dinner
Here are the potential responses and potential actions:
Component A: User ordered Brooklyn style pizza from [Company
1 name]
API A: Use [Application 1 name] to order pizza from [Company 1
name]
API B: Use [Application 2 name] to order pizza from [Company 2
name]
}
```

In some embodiments, the response prompt generation component 210 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data 215 may include "Please generate a polite, respectful, and safe response and one that does not violate protected class policy."

The response language model 220 processes the prompt data 215 to generate model output data 225 representing the one or more selected responses determined to be responsive to the user input, the natural language summary of the one or more selected responses, or the request for additional information (e.g., responsive output data 162 or query output data 163). Similar to the potential response data 143*a-n*, the model output data 225 may include various types of data including audio, text, image, video, etc.

If the response language model 220 determines that one or more of the potential responses are responsive to the user input, the response language model 220 may generate model output data 225 representing the one or more selected responses, or a natural language summary of the one or more selected responses, to be output to the user. For example, based on processing the first example prompt data above, the response language model 220 may select one of the potential responses (e.g., the potential responses from skill component A (e.g., a weather skill component)) determined to be responsive to the user input to generate model output data

225a: {"It is currently 70 degrees, with a high of 75 and a low of 68,"} or the like. For further example, based on processing the first example prompt data provided above, the response language model 220 may select more than one of the potential responses (e.g., the potential responses from both the skill component A and skill component B) determined to be responsive to the user input and generate a summary of the selected responses to generate model output data 225b: {"It is expected to be mostly sunny today, with a high of 75 and a low of 68, but with a chance of rain in the late afternoon,"} or the like.

As another example, based on processing the second example prompt data provided above, the response language model 220 may select one of the potential responses (e.g., the potential response from Component A (e.g., the personalized context component 165) representing that the user order Brooklyn style pizza from [Company 1 name]) determined to be responsive to the user input to generate model output data 225a: {"Ok, I will place an order for Brooklyn style pizza from [Company 1 name],"} or the like. As a further example, based on processing the second example prompt data provided above, the response language model 220 may select more than one of the potential responses (e.g., the potential responses from both component A and API A) determined to be responsive to the user input and generate a summary of the selected responses to generate model output data 225b: {"Ok, I will place an order for Brooklyn style pizza from [Company name] using [Application 1 name],"} or the like.

As such, the response language model 220 may select between the one or more potential responses from one or more different components (e.g., for the first example prompt data, the potential responses from the skill component A and the skill component B and, for the second example prompt data, the potential responses from Component A, API A, and API B) to determine that a subset of the potential responses are responsive to the user input. Thereafter, the response language model 220 may cause output of the selected responses (e.g., the subset of potential responses) or a natural language summary of the selected responses to the user.

In some embodiments, the response arbitration component 160 may also generate and send an instruction to the components, (e.g., API(s), components, agents, etc. as discussed herein below with respect to FIG. 5) configured to perform the potential actions included in the selected responses to cause performance of the potential actions (or another component of the system 100 configured to cause the components to perform the potential actions, such as the action plan execution component 145, which is discussed in more detail herein below). For example, in instances where the selected responses include a potential action to be performed, the response language model 220 may further cause the corresponding components to perform the potential action (e.g., cause API A to order the Brooklyn style pizza from [Company 1 name] using [Application 1 name]). In other embodiments, the system 100 may not generate and/or send the instruction until approval to perform the action(s) is received from the user 105.

If the response language model 220 determines that none of the potential responses are responsive to the user input and/or that an ambiguity exists with respect to the user input and/or one or more of the determined tasks, the response language model 220 may generate model output data 225 representing a request to be output to the user and/or the personalized context component 165. For example, based on processing the first example prompt data provided above, the response language model 220 may determine an ambiguity exists with respect to the size of the pizza to be ordered and may generate model output data 225c: {"What size pizza should I order?",} {"What size pizza does the user usually order?",} or the like to be output to the user and/or sent to the personalized context component 165.

As further discussed herein below, one or more of the components discussed herein (e.g., the plan generation component 135 and/or the LLM shortlister component 140) may be capable of determining whether an ambiguity exists in the user input or the current task, and may determine that additional information is needed. In response to such a determination, the component(s) may be further configured to send a request for such additional information to the response arbitration component 160, which may process as described herein to generate a request for the additional information to be sent to the personalized context component 165 or output to the user 105 to solicit the additional information. In some embodiments, the response arbitration component 160 may send the request for additional information to the action plan execution component 145, which may cause output of the request to the user 105 to solicit the additional information.

The response language model 220 may send the model output data 225 to the compliance component 230, which is configured to determine whether model output data generated by the response language model 220 is appropriate for output to the user 105. In other words, the compliance component 230 processes the model output data 225 to determine whether the model output data 225 includes any inappropriate/sensitive information that should not be output to the user 105 (e.g., confidential information, offensive language, etc.). In some embodiments, the compliance component 230 may be configured to compare the model output data 225 to one or more words determined to be inappropriate/sensitive and should not be output to the user 105. In some embodiments, the compliance component 230 may include/implement an ML model. For example, the ML model may process the model output data 225 to determine whether the model output data 225 includes any inappropriate/sensitive information. During training, the ML model may take as input a plurality of training natural language inputs, where the ML model is tasked with classifying a natural language input as including inappropriate/sensitive information or not. The output of the ML model (e.g., 0, 1, a value between 0 and 1, or the like) resulting from processing with respect to a training natural language input may be compared to a corresponding label representing whether the natural language input includes inappropriate/sensitive information or not. Based on the comparison, one or more parameters of the ML may be configured. In some embodiments, the ML model may be a classifier.

If the output of the compliance component 230 indicates that the model output data 225 includes information that is not appropriate for output to the user 105, the compliance component 230 may cause further processing of the model output data 225 by downstream components to halt. In some embodiments, the response arbitration component 160 may cause the response language model 220 to generate new model output data 225 to be evaluated by the compliance component 230. For example, the response arbitration component 160 may cause the response prompt generation component 210 to generate new prompt data, which may include the prompt data 215, the model output data 225, and an indication that the model output data 225 is not appropriate for output to the user 105. The new prompt data may be an instruction to generate new model output data that is appropriate for output to the user 105.

If the output of the compliance component 230 indicates that the model output data 225 is appropriate for output to the user, the compliance component 230 may send the model output data 225 to the output routing component 240. The output routing component 240 processes the model output data 225 to determine one or more components that are to be caused to process in response to the model output data 225. In other words, the output routing component 240 parses the model output data 225 to determine one or more components that the model output data 225 is to be routed to (or that are to be caused to process based on the model output data 225).

For example, in an instance where the response language model 220 determines that one or more of the potential responses are responsive to the user input and generates model output data 225 including the one or more selected responses (or a natural language summary of the one or more selected responses)/the request for additional information, the output routing component 240 may parse the model output data 225 to determine the selected responses/the natural language summary and send responsive output data 162 corresponding to the selected responses/the natural language summary or query output data 163 to a component configured to generate corresponding data to be output to the user 105. For example, the output routing component 240 may send the responsive output data 162/the query output data 163 to a TTS component (e.g., the TTS component 156), which may process as described herein below to generate output audio data including synthesized speech corresponding to the responsive output data 162/the query output data 163, which the system 100 may send to the user device 110 for output to the user 105. In some embodiments, the system 100 may further include a component configured to generate visual output data (e.g., output image and/or video data) corresponding to the responsive output data 162/the query output data 163, which may be sent to the user device 110 to be output to the user. Similar to the model output data 225, the corresponding responsive output data 162/query output data 163 may include various types of data including audio, text, image, video, etc.

For further example, in embodiments where the model output data 225 includes selected responses (e.g., the responsive output data 162) that include one or more potential actions to be performed, the output routing component 240 may process as described herein above to determine the one or more selected responses/the natural language summary and send the responsive output data 162 to the one or more components associated with the selected responses. In such embodiments, the responsive output data 162 may further include an instruction for the one or more components to perform the potential actions corresponding to the selected responses. For example, in some embodiments, the components corresponding to the potential responses included in the potential response data 143a-n may, after generating the potential responses, suspend processing required to perform the potential action included in the potential responses and await an instruction from the system 100 to perform the potential action. As such, the output routing component 240 may include the instruction in the responsive output data 162 to cause the component to perform the potential action. In some embodiments, the output routing component 240 may generate an API call configured to cause the component to perform the action.

In some embodiments, where the model output data 225 includes selected responses that include one or more potential actions to be performed, the responsive output data 162 may further request authorization from the user 105 to perform the one or more potential actions responsive to the user input. After receiving the request authorization (e.g., via a subsequent user input) the response arbitration component 160 may generate and send the corresponding instruction (or API call) to perform the one or more potential actions responsive to the user input. In some embodiments, the system 100 may store data indicating prior authorization to perform the one or more potential actions responsive to the user input (or one or more actions similar to the one or more potential actions), in which case the response arbitration component 160 may use such data as authorization to perform the one or more potential actions. For example, the user 105 may have previously provided authorization for a set of actions (e.g., turning on outside lights). Thereafter, the system 100 may determine the one or more potential actions to be performed in response to the user input data 127. If the system 100 determines that the one or more actions are included in the set of actions previously authorized by the user 105, the system 100 may not ask for further authorization prior to causing the one or more potential actions to be performed.

For further example, in an instance where the response language model 220 generates model output data 225 including a request for additional information (in response to the response language model 220 determining that none of the potential responses are responsive to the user input and/or an ambiguity exists with respect to the user input and/or one or more of the tasks), which may be determined by the output routing component 240 based on, for example, the model output data 225 including a question, the output routing component 240 may parse the model output data 225 to determine whether the request for additional information is to be sent to the personalized context component 165 and/or output to the user 105. In some embodiments, the response language model 220 may include in the model output data 225 an indication of whether the request for additional information should be sent to the personalized context component 165 and/or output to the user 105. In some embodiments, unless otherwise indicated in the model output data 225, the output routing component 240 may determine to send the request for additional information to the personalized context component 165 prior to outputting the request for additional information to the user 105. In the instance where the personalized context component 165 is unable to resolve the ambiguity (or a component of the system 100 is unable to resolve the ambiguity using the personalized context data generated by the personalized context component 165), the output routing component 240 may determine the request for additional information is to be output to the user 105.

Figure 3:
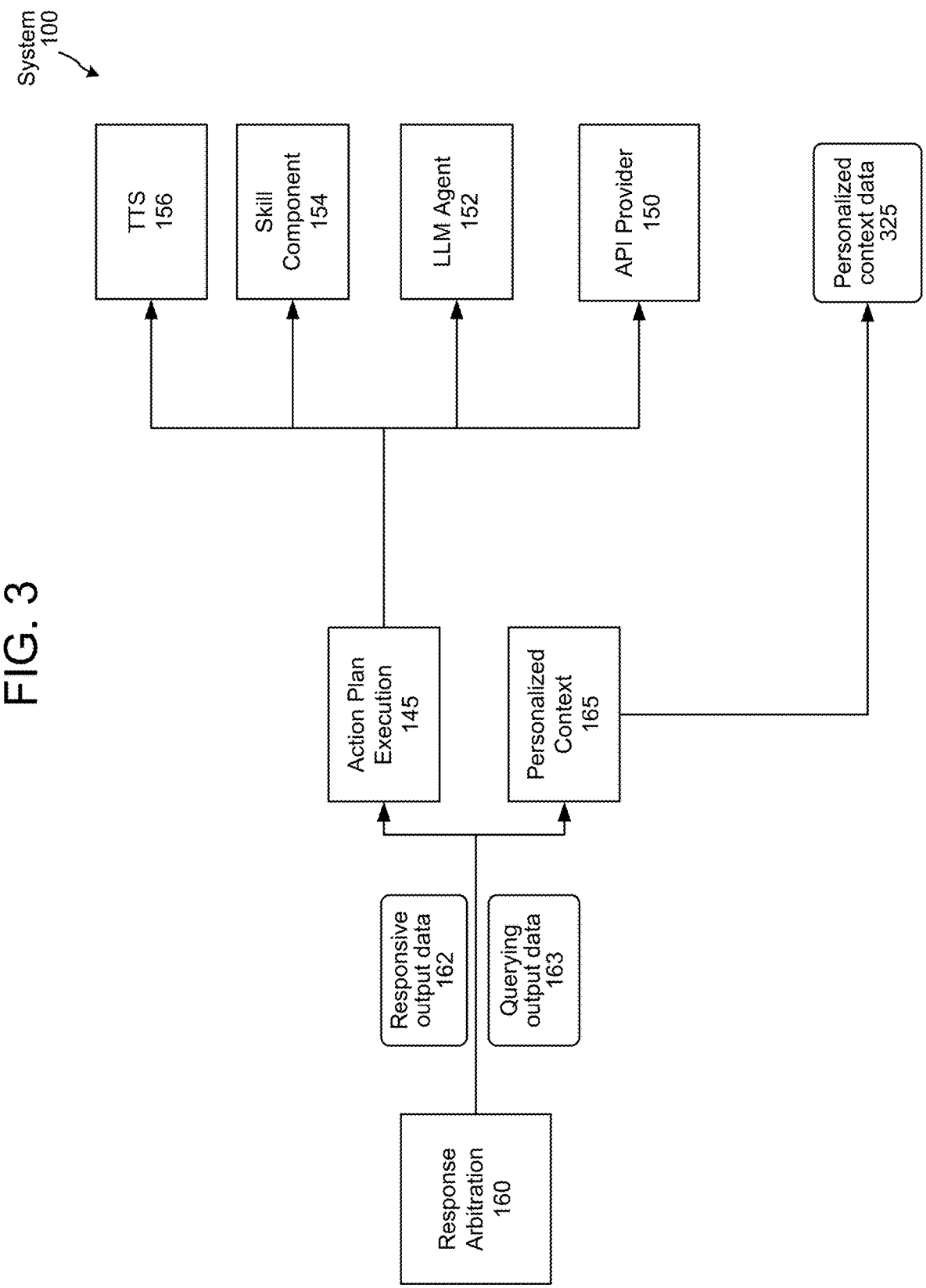
FIG. 3 is a conceptual diagram illustrating example routing of output data by the response arbitration component, according to embodiments of the present disclosure.

FIG. 3 illustrates example components to which the responsive output data 162 and/or the query output data 163 may be sent. As shown in FIG. 3, the query output data 163 may be sent to the personalized context component 165. As discussed above, the query output data 163 may be sent to the personalized context component 165 based on the model output data 225 including a request for additional information and the output routing component 240 determining the request for additional information is to be sent to the personalized context component 165. The personalized context component 165 may process to generate personalized context data 325 associated with the query output data 163 (e.g., the request for additional information). The personalized context data 325 may then be sent to another component of the system 100, such as the plan generation component 135, the LLM shortlister component 140, and/or the response arbitration component 160, which may process as discussed herein above.

The personalized context component 165 may be configured to determine and return contextual information associated with a user input. In some embodiments, the personalized context component 165 may query various components and/or storages (e.g., the profile storage 670) for the contextual information. In some embodiments, the personalized context component 165 may include a storage including one or more portions of the contextual information. In other embodiments, the personalized context component 165 may be/implement an LLM. In such embodiments, the personalized context component 165 may be finetuned on personalized information for one or more users, as is discussed in more detail herein below. Further, in such embodiments, the personalized context component 165 (or the system 100) may include a personalized context prompt generation component (not illustrated), which may be configured to generate a prompt including the user input data 127 (or a representation of an intent of the user input) to be input to the LLM. The prompt may be an instruction for the LLM to determine one or more portions of context data (e.g., the personalized context data 167) associated with the prompt.

As further shown in FIG. 3, the responsive output data 162 and/or the query output data 163 may be sent to the one or more of the TTS component 156. The responsive output data 162 may further be sent to the skill component 154, the LLM agent component 152, and/or the API provider component 150 (e.g., a device controller component).

The TTS component 156 may be configured to process textual or tokenized input to generate audio data representing synthesized speech corresponding to the textual or tokenized input spoken by a synthetic voice. The processing of the TTS component 156 is discussed in detail below with respect to FIG. 6.

The skill component 154 may be software running on the system component(s) 120 that is akin to a software application. That is, a skill component 154 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 154. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 154 may operate in conjunction between the system component(s) 120 and other devices, such as the user device 110, in order to complete certain functions. A skill component 154 may include hardware, software, firmware, or the like that may be dedicated to a particular skill component 154 or shared among different skill components 154.

The LLM agent component 152 may correspond to one or more LLM agents. An LLM agent component 152 may correspond to a custom instantiation of an LLM (and other components) that is configured to handle user inputs relating to a particular domain/functionality. In some embodiments, the LLM agent component 152 may be configured to handle specific use cases via particular prompt generation, finetuning of the LLM, etc. For example, the LLM agent component 152a may be configured to handle user inputs/tasks related to information query, the LLM agent component 152b may be configured handle user inputs/tasks related to shopping, the LLM agent component 152c may be configured to handle user inputs/tasks related to ordering food from various restaurants, the LLM agent component 152d may be configured to handle user inputs/tasks related to ordering food from a particular restaurant (e.g., a particular pizza restaurant), the LLM agent component 152e may be configured to handle user inputs/tasks related to booking a hotel, the LLM agent component 152f may be configured to handle user inputs/tasks related to booking a flight, etc.

For example, the TTS component 156 may process as discussed herein above to generate output audio data corresponding to the responsive output data 162 and/or the query output data 163 (e.g., output audio data corresponding to the one or more actions/natural language summary responsive to the user input, the request for additional information, etc.). Thereafter, the system 100 may send the output audio data to the device 110 for output to the user 105. For further example, the LLM agent component 152 may process as discussed herein above to cause the corresponding one or more actions corresponding to the responsive output data 162 to be performed. As another example, a device controller component of the API provider component 150 may cause a device to perform an action corresponding to the responsive output data 162. For example, if the action represented by responsive output data 162 is to turn on a living room light (e.g., "turn_on_device (device="living room light")), then the device controller component may identify the corresponding living room light, and instruct the living room light to power on (e.g., change its state to {state: ON}).

In some embodiments, the responsive output data 162 and/or the query output data 163 may be sent to the action plan execution component 145, which may send the responsive output data 162 and/or the query output data 163 to the corresponding component/API (e.g., the TTS component 156, the skill component 154, the LLM agent component 152, the API provider component 150, etc.).

In some embodiments, the response arbitration component 160 may be configured to further process data representing a potential responses potentially responsive to the user input that is generated by one or more other components of the system 100 not included in the LLM orchestrator component 130. For example, the response arbitration component 160 may further receive data from an orchestrator component 630 (discussed in detail herein below with respect to FIG. 6) representing a potential response to the user input (e.g., the output of the skill component 154), where the orchestration of the processing performed to generate the potential response was performed by the orchestrator component 630, rather than the LLM orchestrator component 130. In such embodiments, the response arbitration component 160 may be further configured to arbitrate between first potential responses received as a result of the processing of the LLM orchestrator component 130 and second potential responses received as a result of the processing of the orchestrator component 630. As discussed above, the response arbitration component 160 may select one or more portions (e.g., potential actions, potential responses, etc.) of the first potential responses and/or the second potential responses that are determined to be responsive to the user input and cause output of the one or more portions (or a summarized representation of the one or more portions) and/or performance of the potential actions corresponding to the selected responses.

In some embodiments, the data received from the orchestrator component 630 may be included in the potential response data 143a-n. For example, the orchestrator component 630 may be determined to be configured to perform a function (e.g., cause another component(s) to perform a function) potentially relevant to the user input such that the LLM shortlister component 140 may cause the orchestrator component 630 to generate potential responses potentially responsive to the user input, which may be included in the potential response data 143a-n sent to the response arbitration component 160. Further details regarding the processing of the LLM shortlister component 140 to generate the potential response data 143a-n are discussed herein below with respect to FIG. 5.

As discussed above, the response arbitration component may include a self-learning component 250. The self-learning component 250 may be configured to collect, store, and distribute various feedback associated with the processing of the one or more components, discussed herein above, with respect to a user input. The self-learning component 250 may use the feedback to cause the one or more components to be updated/trained based on the various feedback. In some embodiments, the self-learning component 250 may be located elsewhere in the system 100, outside of the response arbitration component 160.

Figure 4:
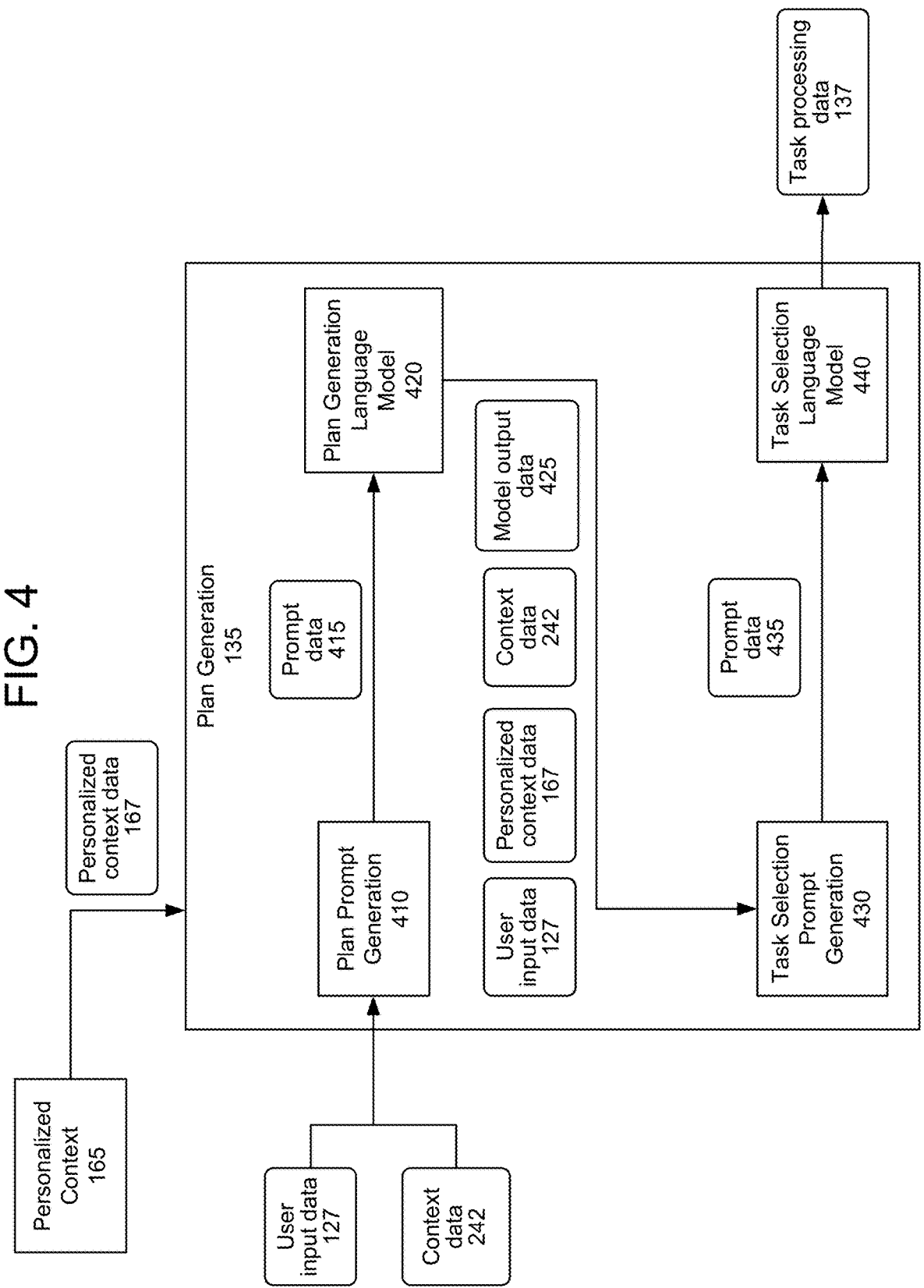
FIG. 4 is a conceptual diagram illustrating example components and processing of a plan generation component, according to embodiments of the present disclosure.
Figure 5:
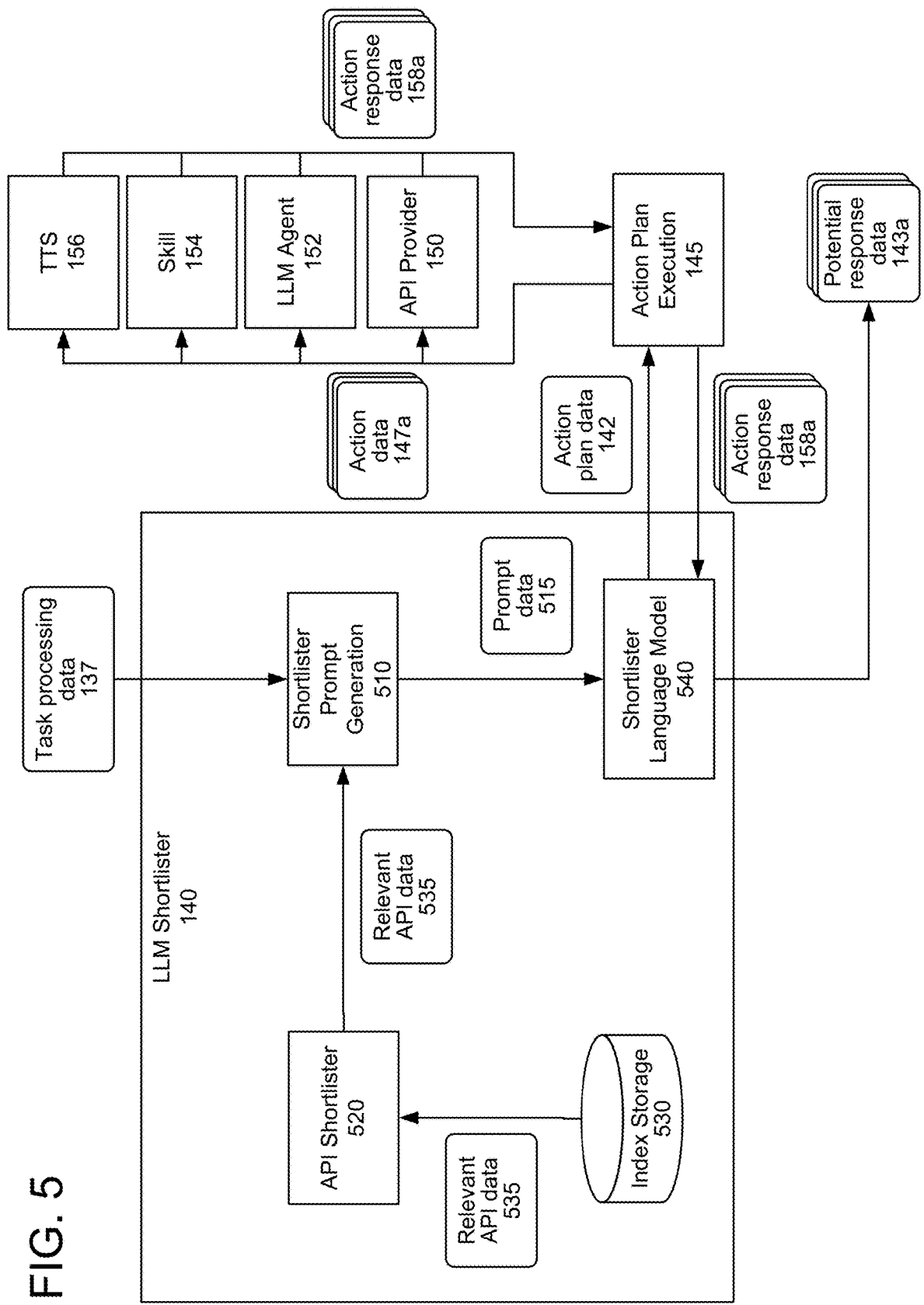
FIG. 5 is a conceptual diagram illustrating example components and processing of an LLM shortlister component, according to embodiments of the present disclosure.

For example, the self-learning component 250 may collect and store various information (e.g., feedback signal 255a-n) associated with processing with respect to a user input, such as a determined task(s) associated with performance of an action responsive to the user input, a selected task, a prioritization of tasks, a selected API(s), an API-generated potential response(s), interaction history data, dialog history data, or any other data generated during the processing discussed herein below with respect to FIGS. 4-5. The self-learning component 250 may further collect information (e.g., feedback signal 255a-n) associated with a user satisfaction with the processing of the system 100. The self-learning component 250 may determine such user satisfaction information based on implicit and explicit feedback signals (e.g., feedback signal 255a-n). For example, an explicit feedback signal 255a may be a follow-up user input associated with the response generated by the system 100 (e.g., "Add milk, please."), the response arbitration component 160 receiving varying results from processing performed by the orchestrator component 630 and the LLM orchestrator component 130 (e.g., a first potential response from the orchestrator component 630 including a potential action of "add milk to your grocery list" and a second potential response from the LLM orchestrator component 130 including a request for additional information of "can you specify the list?"), a request for additional information output to the user and the user's corresponding response, a system-determined quality of a generated request for additional information, etc.

For further example, an implicit feedback signal 255b may be a follow-up user input associated with the response generated by the system 100 (e.g., "Add milk, please."), the response arbitration component 160 receiving varying results from processing performed by the orchestrator component 630 and the LLM orchestrator component 130 (e.g., a first potential response from the orchestrator component 630 including a potential action of "add milk to your grocery list" and a second potential response from the LLM orchestrator component 130 including a potential action of "add milk to your shopping list"), a follow-up user input resulting from a user interrupting output of a system-generated response (e.g., prior to completing output of a system-generated response of "adding milk to your shopping list", the user provides the interrupting user input of "no, add it to my grocery list"), a system-determined quality of a system-generated response attempting to preempt a follow-up user input (e.g., a preemptive system-generated response of "add milk to your shopping list" may receive a lower quality score than a preemptive system-generated response of "do you want to add milk to your shopping list?"), etc.

The various data (e.g., feedback signal 255a-n) collected by the self-learning component 250 may be used to update/train one or more components of the arbitration component. For example, if a user previously provided a follow-up user input requesting that future outputs be kept to a minimal amount of words, the self-learning component 250 may receive the follow-up user input as an explicit feedback signal 255a and may use the explicit feedback signal 255a to update the response prompt generation component 210. As shown in FIG. 2, the self-learning component 250 may generate self-learning data 260a/260b representing training data including the explicit feedback signal 255a and send the self-learning data 260a to the response prompt generation component 210 and/or send the self-learning data 260b to the response language model 220. The response prompt generation component 210 may be updated/trained based on the self-learning data 260a such that, for a user input associated with the user that provided the follow-up user input, the response prompt generation component 210 may include in the prompt data an indication that the response language model 220 should generate a short and concise response to the user. The response language model 220 may be updated/trained based on the self-learning data 260b such that the response language model 220 is better configured for generating short and concise responses. In some embodiments, the various data (e.g., feedback signal 255a-n) collected by the self-learning component 250 may be used by the system 100 to update/train one or more components of the system 100. In such embodiments, the self-learning component 250 may send the self-learning data 260c to another component of the system 100 to update/train the component. For further example, if a user previously provided a follow-up user input of "Add milk, please," in response to a system-generated response to a user input of "Add eggs to my list", the self-learning component 250 may receive the follow-up user input as an explicit feedback signal 255b and may use the explicit feedback signal 255b to update a user profile associated with the user (e.g., represented in the profile storage 670) and/or update a storage/index of the personalized context component 165. The self-learning component 250 may generate self-learning data 260c representing training data including the explicit feedback signal 255b and send the self-learning data 260c to the profile storage 670 and/or the personalized context component 165. For example, the personalized context component 165 may be updated/trained based on the self-learning data 260c such that processing of a similar future input of "Add eggs to my list" may result in the personalized context component 165 generating personalized context data representing that the user has previously also added milk to their list. The system 100 may use this personalized context data to generate a response of "Would you also like me to add milk to your list?".

In some embodiments, the system 100 may update/train one or more components of the system 100 during offline operations. In such embodiments, the system may store the feedback signal 255*a-n* in a storage (e.g., the memory storage discussed herein below) until the system 100 is no longer performing online operations. Thereafter, the system 100 (e.g., the response arbitration component 160) may cause the self-learning data retrieval component 270 to retrieve stored feedback data 275*a-n* representing the feedback signal 255*a-n* received during online operations. In some embodiments, the stored feedback data 275*a-n* may correspond to self-learning data associated with updating/training a particular component(s). The stored feedback data 275*a-n* may be sent to the self-learning component, which may process as described herein above to cause one or more components of the system 100 to be updated/trained.

FIG. 4 illustrates example processing of the plan generation component 135. As shown in FIG. 4, the plan generation component 135 may include a plan prompt generation component 410, a plan generation language model 420, a task selection prompt generation component 430, and a task selection language model 440.

As further shown in FIG. 4, the user input data 127 is received at the plan prompt generation component 410. The plan prompt generation component 410 processes the user input data 127 to generate prompt data 415 representing a prompt for input to the plan generation language model 420. In some embodiments, the plan prompt generation component 410 may further receive an indication of one or more remaining tasks to be completed with respect to the user input data 127. A task to be completed may correspond to a task for which the system 100 has yet to generate potential responses for (e.g., for which the API provider component 150, the LLM agent component 152, the skill component 154, and/or the TTS component 156 have yet to generate action response data for). Similarly, a completed task may correspond to a task for which the system 100 has generated potential responses for (for which the API provider component 150, the LLM agent component 152, the skill component 154, and/or the TTS component 156 have generated action response data). For example, if the current iteration of processing with respect to the user input data 127 is a subsequent iteration of processing (e.g., the system previously determined that more than one task is to be completed in order to perform an action responsive to the user input data 127 and has previously generated potential responses for at least a first task of the more than one tasks), then the plan prompt generation component 410 may further receive an indication of the remaining tasks to be completed. In such embodiments, the plan prompt generation component 410 may further receive an indication of the task(s) to complete processing for and/or the potential response(s) of the processing. The plan prompt generation component 410 may further receive the context data 242 representing various contextual signals associated with the user input data 127, such as weather information, time of day, device information associated with the device that sent the user input data 127 (e.g., device ID, device states, historical device interaction data, etc.). Such prompt data 415 may be generated based on combining the user input data 127 and the context data 242 (and, in some embodiments, the indication of the remaining task(s), completed task(s), and/or the potential responses). In some embodiments, the prompt data 415 may be generated further based on the personalized context data 167.

The plan prompt generation component 410 may receive the personalized context data 167 from the personalized context component 165. As discussed herein above, the personalized context component 165 may be configured to determine and return contextual information associated with a user input to the plan prompt generation component 410, which the plan prompt generation component 410 may combine with the user input data 127 to generate the prompt data 415.

As discussed herein above, the personalized context component 165 may be caused to generate and return the personalized context data 167 based on the system 100 determining that additional information is needed in order to generate potential responses for a task associated with a user input. For example, one or more of the components of the system 100 (e.g., the plan generation language model 420, the task selection language model 440, the shortlister language model 540, the response arbitration component 160) may determine that an ambiguity exists in the user input (or the data determined/generated as a result of processing with respect to the user input). In such examples, the personalized context component 165 may receive the user input, the current task, and/or model output data indicating that an ambiguity exists/additional information should be determined (e.g., model output data representing "Does the user prefer to use [Music Streaming Service 1] or [Music Streaming Service 2] for playing music," "I need to determine whether the user prefers [Music Streaming Service 1] or [Music Streaming Service 2] for playing music" or the like). The personalized context component 165 may process as described herein above to generate the personalized context data 167 (e.g., "The user prefers [Music Streaming Service 1].")

In some embodiments, plan prompt generation component 410 (or another component of the system 100) may process the personalized context data 167, the user input data 127, and/or the potential responses associated with the user input data 127 to generate a natural language representation of the user input (represented by the user input data 127) that is updated to include the contextual information of the personalized context data 167 (e.g., a contextual rewrite of the user input). Thereafter, the plan prompt generation component 410 may process to generate the prompt data 415 using the updated user input data.

In some embodiments, the prompt data 415 may be an instruction for the plan generation language model 420 to determine one or more tasks (e.g., steps/actions) that are to be completed in order to perform an action responsive to the user input given the other information (e.g., the personalized context data 167, the indication of the remaining task(s), the indication of the completed task(s), and/or the corresponding potential responses) included in the prompt data 415.

In some embodiments, the plan prompt generation component 410 may also include in the prompt data 415 a sample processing format to be used by the plan generation language model 420 when processing the prompt. In some embodiments, the plan prompt generation component 410 may generate the prompt data 415 according to a template format. For example, the prompt data 415 may adhere to a template format of:

{
Create a new task if necessary to help complete a request to [user input data 127 (or a representation of a determined intent of the user input data 127].
Here are the completed tasks, the potential responses, user inputs, and context so far:
[completed tasks, the potential responses, dialog history, context data 242, personalized context data 167]

-continued

```
These are the remaining tasks to be completed:
[remaining task data]
Based on the result, create new tasks to be completed, if necessary.
Return the tasks as an array.
}
```

In some embodiments, the template format may instruct the plan generation language model 420 as to how it should process to generate the one or more tasks (e.g., steps) that are to be completed. In some embodiments, the format may further include an indication, such as a label of "User:" indicating the following string of characters/tokens as the user input. In some embodiments, the format may further include a label of "Thought:" instructing the plan generation language model 420 to generate an output representing the determined interpretation of the user input by the plan generation language model 420 and/or an action that should be taken (e.g., the user is requesting [intent of the user input], the user is trying to [intent of the user input], need to determine [information needed to properly process the user input], etc.). In some embodiments, the format may further include an indication of "Observation:" indicating the following string of characters/tokens as the result of performance of an action determined by the plan generation language model 420/the plan generation language model 420's interpretation of the result of the performance of the action determined by the plan generation language model 420 (e.g., the completed tasks and/or their potential responses). In some embodiments, the format may further include an indication of "Response:" instructing the plan generation language model 420 to generate a response (e.g., one or more tasks to be completed) to the prompt.

Following such a template format, for example, and for a user input of "turn on all of the lights except the garage," the plan prompt generation component 410 may generate example prompt data 415*a*:

```
{
Create a new task if necessary to help complete a request to turn on
all of the lights except the garage.
Here are the completed tasks, their potential responses, user inputs,
and context so far:
[ ]
These are the remaining tasks to be completed:
[ ]
Based on the result, create new tasks to be completed, if necessary.
Return the tasks as an array.
}
```

As an example of a user input that is associated with more than one task, the system 100 may receive a user input of "please order some pizza for dinner" and may determine a task list of "identify user pizza preference" and "find application that enables ordering of pizza." Thereafter, the system 100 may process as described herein below to select and complete the task of "identify user pizza preference." The plan prompt generation component 410 may process the user input, corresponding context data, the remaining task list, and the potential responses (e.g., the users pizza preference, determined, for example, by the personalized context component 165) to generate example prompt data 415*a*:

```
{
Create a new task if necessary to help complete a request to order
some pizza for dinner.
Here are the completed tasks, their potential responses, user inputs,
and context so far:
Completed tasks:
    Identify user pizza preference: user ordered Brooklyn style
pizza from [Company name]
These are the remaining tasks to be completed:
Find application to order pizza
Based on the result, create new tasks to be completed, if necessary.
Return the tasks as an array.
}
```

In some embodiments, the plan prompt generation component 410 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data 415 may include "Please generate a polite, respectful, and safe response and one that does not violate protected class policy."

The plan generation language model 420 processes the prompt data 415 to generate model output data 425 representing one or more predicted tasks to be completed in order to perform the action responsive to the user input. For example, based on processing the first example prompt data provided above, the plan generation language model 420 may output model output data 425*a*: {"turn on all of the lights except the garage light,"} or the like. For further example, as discussed above, based on processing prompt data corresponding to the user input "please order some pizza for dinner" the plan generation language model 420 may output model output data 425*b*: {"identify user pizza preference;" "find application that enables ordering of pizza," or the like. After the first task of "identify user pizza preference" is complete, and based on processing the second example prompt data provided above, the plan generation language model 420 may further output model output data 425*c*: {"find an application to order pizza" "find API to order [Company name] pizza,"} or the like. In some embodiments, the threshold for determining the one or more tasks may be such that the plan generation language model 420 is encouraged to generate multiple predicted tasks for a given user input, where the system 100 may parse and filter the list of tasks during downstream processing (e.g., during the processing of the task selection language model 440). For example, based on processing the first example prompt data provided above, the plan generation language model 420 may output model output data 425*d*: {"turn on all of the lights except the garage light," "turn on all lights," "identify which garage light," "turn on all lights then turn off garage light," "turn on all lights where user is located," "turn on kitchen lights, living room lights, dining room lights, hallways lights" "turn on all lights on first floor,"} or the like.

The model output data 425 is sent to the task selection prompt generation component 430, which processes the model output data 425 to generate prompt data 435 representing a prompt for input to the task selection language model 440. In some embodiments, such prompt data 435 may be generated based on combining the user input data 127, the personalized context data 167, the prompt data 415, and/or the model output data 425. In some embodiments, the plan generation component 135 may include another component that parses the model output data 425 to determine the one or more tasks and may send a representation of the one or more tasks to the task selection prompt generation component 430.

In some embodiments, the prompt data 435 may be an instruction for the task selection language model 440 to select a task of the one or more tasks that is to be completed first (e.g., completed during the current iteration of processing) given the information (e.g., user input data 127, the personalized context data 167, and the one or more tasks) included in the prompt data 435. In some embodiments, the prompt data 435 may further include an instruction for the task selection language model 440 to determine a priority of the one or more tasks (e.g., an ordered list representing the order in which the one or more tasks are to be completed). As discussed above, with respect to the plan prompt generation component 410, in some embodiments, the task selection prompt generation component 430 may also include in the prompt data 435 a sample processing format to be used by the task selection language model 440 when processing the prompt. Similarly, in some embodiments, the task selection prompt generation component 430 may generate the prompt data 435 according to a template format, such as:

```
{
Select the top prioritized task given the ultimate goal of [user input
data 127 (or a representation of a determined intent included in the
user input data 127]
Here are the completed tasks, their potential responses, and user
inputs so far:
[completed tasks, potential responses associated with the tasks,
dialog history, context data, personalized context data 167]
Here are the task candidates:
[remaining tasks]
Return your selected task, return None if the goal is achieved or
indicate existing ambiguities.
}
```

In some embodiments, the template format may instruct the task selection language model 440 as to how it should process to select the task and/or prioritize the one or more tasks. In some embodiments, as discussed above, the format may further include indications of the "User:", "Thought:", "Action:", "Observation:", and/or "Response:" indicators.

Following such a template format, for example, and for the first example user input provided above of "turn on all of the lights except the garage," the task selection prompt generation component 430 may generate example prompt data 435*a*:

```
{
Select the top prioritized task given the ultimate goal of turn on all
of the lights except the garage
Here are the completed tasks, their potential responses, user inputs,
and context so far:
[ ]
Here are the task candidates:
Turn on all of the lights except the garage light
Return your selected task, return None if the goal is achieved or
indicate existing ambiguities.
}
```

For further example, for the second example user input provided above of "please order some pizza for dinner," the task selection prompt generation component 430 may generate example prompt data 435*b*:

```
{
Select the top prioritized task given the ultimate goal of please
order some pizza for dinner
Here are the completed tasks, their potential responses, user inputs
and context so far:
Completed tasks:
    Identify user pizza preference: user ordered Brooklyn style
pizza from [Company name]
Here are the task candidates:
find an application that sells pizza
find API that sells [Company name] pizza
Return your selected task, return None if the goal is achieved or
indicate existing ambiguities.
}
```

In some embodiments, the task selection prompt generation component 430 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The task selection language model 440 processes the prompt data 435 to generate model output data representing the task to be completed first and/or a prioritization of the one or more tasks. For example, based on processing the first example prompt data provided above, the task selection language model 440 may output model output data: {"1. Turn on all of the lights except the garage light,"} or the like. For further example, based on processing the second example prompt data provided above, the task selection language model 440 may output model output data: {"1. Find an API that sells [Company name] pizza,"} or the like. In some embodiments, during processing of the task selection language model 440 to select and/or prioritize the one or more tasks, the task selection language model 440 may update the task list to remove any redundant and/or conflicting tasks. For example, for the second example prompt data, the task selection language model 440 may determine that the remaining tasks of "find an application that sells pizza" and "find an API that sells [Company name] pizza" are redundant, and that "find an API that sells [Company name] pizza has a higher priority. Therefore, the task selection language model 440 may remove the task of "find an application that sells pizza" from the remaining task list. Thereafter, the plan generation component 135 (or another component of the plan generation component 135) may process the model output data of the task selection language model 440 to determine task processing data 137 representing the user input data 127, the personalized context data 167, and/or the task selected by the task selection language model 440 to be completed first. In some embodiments, the task processing data 137 may include the remaining one or more tasks and/or may indicate the prioritization of the one or more tasks, as determined by the task selection language model 440. The task processing data 137 may be sent to the LLM shortlister component 140, which is described in detail herein below with respect to FIG. 5.

FIG. 5 illustrates example processing of the LLM shortlister component 140. As shown in FIG. 5, the LLM shortlister component 140 may include an index storage 530, an API shortlister component 520, a shortlister prompt generation component 510, and a shortlister language model 540.

As further shown in FIG. 5, the task processing data 137 is received at the shortlister prompt generation component 510. The shortlister prompt generation component 510 processes the task processing data 137 to generate prompt data 515 representing a prompt for input to the shortlister language model 540. In some embodiments, such prompt data 515 may be generated based on combining the task processing data 137 (e.g., the user input data 127, the selected task, remaining tasks, potential responses associated with one or more previous tasks, etc.) and relevant API data 535 representing one or more APIs associated with the user input data 127 and/or the current task.

The relevant API data 535 may be generated by the API shortlister component 520, which may be configured to retrieve one or more (e.g., top-k) relevant APIs associated with the user input data 127 or the current task. In some embodiments, the APIs may correspond to various components. For example, the components may correspond to rule-based components, ML-based components, LLM-based components, or the like, such as the personalized context component 165, the skill component(s) 154, the LLM agent component(s) 152, the TTS component 156, the orchestrator component 630, etc.) In some embodiments, the APIs may correspond to the components.

The API shortlister component 520 may use retrieval-based approaches to retrieve the one or more relevant APIs from the index storage 530, which may store various information associated with multiple APIs such as API descriptions, API arguments (e.g., parameter inputs/outputs), identifiers for components (e.g., such as personalized context component 165, skill component(s) 154, LLM agent component(s) 152, TTS component 156) that provides the API, etc. For example, the API shortlister component 520 may compare one or more APIs included in the index storage 530 to the user input or the current task to determine one or more APIs (top-k) that corresponds to the user input or the current task (e.g., APIs that are semantically similar to the user input or the current task, APIs that are capable of performing the current task, etc.). In some embodiments, the API shortlister component 520 (or another component of the API shortlister component 520) may determine an encoded representation of the user input or the current task and compare (e.g., using cosine similarity) the encoded representation(s) to an encoded representation of an API description for the API to determine whether the API is semantically similar to the user input or the current task. An API description may correspond to a description of the one or more function that the API is configured to perform and/or other information associated with the API (e.g., an API call formatting structure (e.g., including input parameters), historical accuracy/defect rate, historical latency value, etc.). In some embodiments, the API description may further include one or more exemplars associated with use of the API (e.g., an example user input, corresponding API call, and example API output). If the value of semantic similarity meets or exceeds a threshold, the API (and, optionally, the API description) may be included in the relevant API data 535. In some embodiments, the API shortlister component 520 may determine the relevant API data 535 further using contextual information, including the personalized context data 167, an accuracy/defect rate value associated with the APIs, and/or a historical latency value associated with the APIs (e.g., which may be included in the description of the API). In some embodiments, the index storage 530 may be included in the API shortlister component 520. Similar processing may be performed to determine one or more components that are semantically similar to the user input or the current task, which may be included in the relevant API data 535. The API retrieval may send the relevant API data 535 to the shortlister prompt generation component 510.

In some embodiments, the prompt data 515 may be an instruction for the shortlister language model 540 to determine one or more APIs that are to process with respect to the user input or the current task (e.g., determine one or more API calls to cause the APIs to process) given the information (e.g., the user input data 127, the personalized context data 167, the current task, and the relevant API data 535). As discussed above, with respect to the plan prompt generation component 410 and the task selection prompt generation component 430, in some embodiments, the shortlister prompt generation component 510 may also include in the prompt data 515 a sample processing format to be used by the shortlister language model 540 when processing the prompt. Similarly, in some embodiments, the shortlister prompt generation component 510 may generate the prompt data 515 according to a template format, such as:

```
{
You are an AI agent to find and execute an API to complete the
  task of [user input data 127 / current task]
Here are a list of relevant API available:
[API data 535]
Use the following format:
Thought: think about what to do
API: API calls compatible with the task
Observation: the result of the API call
Summary: summarized results from the API call
If no appropriate API is found, summarize as nothing is found.
}
```

Following such a template format, for example, and for a selected task of "turn on all of the lights except the garage light" and corresponding relevant API data, the shortlister prompt generation component 510 may generate example prompt data 515a:

```
{
You are an AI agent to find an execute an API to complete the task
  of turn on all of the lights except the garage light
Here are a list of relevant API available:
Let's chat API
Classic NLU API
Smart Home skill
Use the following format:
Thought: think about what to do
API: API calls compatible with the task
Observation: the result of the API call
Summary: summarized results from the API call
If no appropriate API is found, summarize as nothing is found.
}
```

In some embodiments, the shortlister prompt generation component 510 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The shortlister language model 540 processes the prompt data 515 to generate one or more API calls corresponding to request(s) that the corresponding APIs return a potential response to the user input/current task and/or a potential action(s) that the APIs are configured to/will perform with respect to the user input and/or the current task (e.g., a natural language description of the potential action(s)). As such, in some embodiments, the shortlister language model 540 may generate API calls for a subset of the APIs represented in the prompt data 515. The shortlister language model 540 may generate the one or more APIs calls (including the required input parameters) by applying in-context learning for cold-starting APIs (e.g., one-shot/few-shot learning). For example, in embodiments where the relevant API data 535 includes the API descriptions, the shortlister language model 540 may use the one or more exemplars included in the API descriptions (included in the prompt data 515) to determine the one or more input parameters for the API call. In some embodiments, the shortlister language model 540 may be finetuned on such exemplars (e.g., during offline or runtime processing), such that the shortlister language model 540 is capable of determining the one or more input parameters for the given API call.

During processing of the shortlister language model 540 and after generating the one or more requests, the shortlister language model 540 may cause the one or more requests to be executed. For example, as shown in FIG. 5, the shortlister language model 540 may send action plan data 142 representing the one or more requests to the action plan execution component 145, which causes execution of the one or more requests included in the action plan data 142. For example, the action plan execution component 145 may process the action plan data 142 to generate action data 147a-n. Action data 147a may represent, for example, an instruction (e.g., an executable API call determined from/generated based on the action plan data 142) for a particular API to process with respect to the user input and/or the current task. In embodiments where the action plan data 142 includes requests corresponding to incomplete API calls, API call formats, indications of actions to be performed by one or more components, the action plan execution component 145 may be configured to generate executable API calls corresponding to the action plan data 142. In some embodiments, the action plan execution component 145 may generate the action data 147a-n to represent an instruction to provide the responses including the potential response(s)/potential action(s) with respect to the user input and/or the current task.

The action plan execution component 145 may send the action data 147a-n to the API provider component 150, the LLM agent component 152, the skill component 154, and/or the TTS component 156. The API provider component 150 may include one or more components (e.g., rule-based components, ML-based components, LLM-based components, or the like) that may be caused to process using the action data 147a-n (e.g., using the API calls generated by the LLM shortlister component 140).

As discussed herein above, the system 100 may include the TTS component 156, the skill component 154, and the LLM agent component 152.

As discussed above, the API provider component 150 may include various components that may be caused to execute using the action data 147a-n. For example, the API provider component 150 may include an entity recognition (ER) component, which may be configured to process textual or tokenized input to link one or more entity references included in the textual or tokenized input to a specific corresponding entity known to the system 100. For example, based on the textual or tokenized input (e.g., a context of the textual or tokenized input), the ER component may determine that a reference to "Neil Armstrong" is directed to the American astronaut. In some embodiments, the action data 147a-n may include an indication(s) (e.g., slots) of one or more entities included in the user input, as determined by one or more of the language models 420, 440, 540, in which case the ER component may process to link the one or more entities to the specific, referenced, entity known to the system 100.

In other embodiments, the ER component may be configured to process the action data 147a-n to determine the one or more entities included in the user input and link the one or more determined entities to the specific, referenced, entity (entities) known to the system 100. For example, the ER component may include one or more recognizers. Each recognizer may include a named entity recognition (NER) component. The NER component applies grammar information and lexical information (received from a storage) associated with a domain (associated with the recognizer implementing the NER component) to determine a mention of one or more entities in text data. In this manner, the NER component identifies "slots" (each corresponding to one or more particular words in text data) that may be useful for later processing. The NER component may also label each slot with a type (e.g., noun, place, city, artist name, song name, etc.). Thereafter, the ER component links a slot of text data to a specific entity known to the system. To perform entity resolution, the ER component may utilize gazetteer information stored in an entity library storage. The gazetteer information may be used to match text data (representing a portion of the user input) with text data representing known entities, such as song titles, contact names, etc. Gazetteers may be linked to users (e.g., a particular gazetteer may be associated with a specific user's music collection), may be linked to certain domains (e.g., a shopping domain, a music domain, a video domain, etc.), or may be organized in a variety of other ways.

For further example, the API provider component 150 may include a search component, which may be configured to query a storage (e.g., a database, repository, knowledge base, etc.) for information usable for generating a response to a user input. For example, if the action data 147a-n represents a request for information of "Who won the game between [Team 1 Name] and [Team 2 Name]," then the search component may query the storage (or other sources, such as the Internet), to retrieve the information "[Team 1 Name] won the game between [Team 1 Name] and [Team 2 Name]."

As an even further example, the API provider component 150 may include the device controller component discussed herein above, which may be further configured to cause a device to perform an action corresponding to the action data 147a-n.

In some embodiments, the API provider component 150 may include a domain service component, which may be configured for interacting with one or more services defined by particular users, such as developers, specialists, or the like (e.g., to receive information, such as responses or annotations, to cause an action.

The API provider component 150, the LLM agent component 152, the skill component 154, and/or the TTS component 156 may send action response data 158a-n representing one or more potential responses generated by the one or more APIs corresponding to the action data 147a-n (e.g., the potential response(s) and/or potential action(s)) to the action plan execution component 145. For example, in response to an API call to the skill component 154 associated with a user input for turning on a light, the action response data 158a may correspond to a potential action of "turn on the light," "turn_on_device ("light", [device ID])", or the like. For further example, in response to an API call to the skill component 154 associated with a user input for ordering a pizza from a particular restaurant, the action response data 158*b* may correspond to a potential action of "order medium pizza from [restaurant name]", "order_pizza ("medium", "pizza", "[restaurant name]")", or the like. The action plan execution component 145 may send the action response data 158*a-n* to the shortlister language model 540.

In some embodiments, the shortlister language model 540 may process the action response data 158*a-n* to generate a natural language summary of the action response data (e.g., the potential response data 143*a-n*). In some embodiments, the potential response data 143*a-n* may include an association between action response data 158*a* (or a summarized representation of the action response data 158*a*) and an indication of the API/component that generated the action response data 158*a* (e.g., a component identifier, API description, etc.). In some embodiments, the shortlister language model 540 may be configured to filter and/or rank the action response data 158*a-n* based on how relevant the action response data 158*a-n* is to the current task. In some embodiments, the shortlister language model 540 may be configured to filter and/or rank the action response data 158*a-n* based on a confidence level of the component that provided the action response data, where the confidence level may indicate a likelihood of the component being able to respond (e.g., within a period of time), the component being able to perform a potential action that corresponds to the current task, etc. In some embodiments, the action response data 158*a-n* may indicate whether or not the corresponding component is able to respond (e.g., the action response data 158*a* may include a Boolean value such as "yes" or "no" or other similar indications). In some embodiments, the shortlister language model 540 may filter and/or rank the action response data 158*a-n* based on information included in the prompt data 515 (e.g., the user input data 127, the relevant API data 535, the context data 242 the personalized context data 167, the prompt data 415, etc.). For example, the potential response data 143*a-n* may include a subset of the action response data 158*a-n* (or the summarized representations of the action response data 158*a-n*) and may further include a representation of a confidence associated with the action response data 158*a* (or a summarized representation of the action response data 158*a*). As such, the potential response data 143*a-n* may further include data representing a confidence of how relevant the action response data 158*a* is to the current task. In some embodiments, the shortlister language model 540 may consider a rating associated with the component that provided the action response data 158*a*, where the rating may be a user satisfaction rating provided by multiple different users of the system 100, a user satisfaction rating provided by the user 105 associated with the user input data 127, a system generated rating based on the number of past tasks handled by the component, a accuracy rating based on the number of past tasks the component had handled correctly/provided a desired response for, etc.

The LLM shortlister component 140 may send the potential response data 143*a-n* for further processing. In instances where the plan generation component 135 determined that more than one task is to be completed, the LLM shortlister component 140 may send the potential response data 143*a-n* to the plan generation component 135, which may process as described herein above to maintain and prioritize the task list based on the potential response data 143*a-n* and select a new task to be completed. In instances where the plan generation component 135 determined that only one task is to be completed, or in instances where the LLM shortlister component 140 determines that there are no remaining tasks to be completed, the LLM shortlister may send the potential response data 143*a-n*, and the potential responses associated with previously completed tasks (e.g., previous action response data) to the response arbitration component 160 to process as discussed herein above. The LLM shortlister component 140 may further send the user input data 127, the context data 242, the personalized context data 167, etc., to the plan generation component 135 and/or the response arbitration component 160.

In some embodiments, the LLM orchestrator component 130 may further include a memory storage (not illustrated) which may store various information associated with the processing performed (e.g., user input data 127, the prompt data 415, the context data 242, the personalized context data 167, the model output data 425, prompt data 435, the task processing data 137, the relevant API data 535, the prompt data 515, the action plan data 142, the action response data 158*a-n*, the potential response data 143*a-n*, etc.) during one or more previous iterations of processing by the LLM orchestrator component 130 for the user input data 127. As such, after the LLM shortlister component 140 generates the potential response data 143*a-n*, the LLM orchestrator component 130 may send the abovementioned data to the memory storage. In some embodiments, the above-mentioned data may be sent to the memory storage as it is generated by the system 100.

In such embodiments, one or more of the prompt generation components discussed herein may be configured to include (e.g., append) one or more portions of the data included in the memory storage in the data (e.g., the generated prompts) to the corresponding language models. For example, during a subsequent iteration of processing, the plan prompt generation component 410 may receive one or more portions of the data included in the memory storage (which were generated during one or more previous iterations of processing performed with respect to the user input data 127) and include the one or more portions of data in the prompt data 415.

As discussed herein above, the shortlister language model 540 may be configured to determine whether additional information is needed in order to complete the current task (e.g., if an ambiguity exists in the user input data 127 or the current task, if the current task is to resolve an identified ambiguity, if an API argument is missing from the user input or other available data, etc.), in which case the shortlister language model 540 may send data representing a request for such additional information to the response arbitration component 160. In some embodiments, the action plan data 142 may represent the request for additional information, and the action plan execution component 145 may be configured to send corresponding action data 147 to the personalized context component 165. For example, for the example provided herein above with respect to ordering pizza, the shortlister language model 540 may determine that in order to resolve an ambiguity with respect to the user input data 127 or current task (e.g., based on the current task being to resolve the ambiguity or a determination that the current task cannot be completed due to the ambiguity), the system 100 must "identify user pizza preference," or the like. The system 100 may send a request to the personalized context component 165 to "identify user pizza preference" and the personalized context component 165 may process as described herein above to return personalized context data resolving the ambiguity (e.g., the user's pizza preference may be determined to be a cheese pizza or a pepperoni pizza).

In some embodiments, the language models 420, 440, 540, 220 may be fine-tuned to perform a particular task(s).

Fine-tuning of the language models 420, 440, 540, 220 may be performed using one or more techniques. One example fine-tuning technique is transfer learning that involves reusing a pre-trained model's weights and architecture for a new task. The pre-trained model may be trained on a large, general dataset, and the transfer learning approach allows for efficient and effective adaptation to specific tasks. Another example fine-tuning technique is sequential fine-tuning where a pre-trained model is fine-tuned on multiple related tasks sequentially. This allows the model to learn more nuanced and complex language patterns across different tasks, leading to better generalization and performance. Yet another fine-tuning technique is task-specific fine-tuning where the pre-trained model is fine-tuned on a specific task using a task-specific dataset. Yet another fine-tuning technique is multi-task learning where the pre-trained model is fine-tuned on multiple tasks simultaneously. This approach enables the model to learn and leverage the shared representations across different tasks, leading to better generalization and performance. Yet another fine-tuning technique is adapter training that involves training lightweight modules that are plugged into the pre-trained model, allowing for fine-tuning on a specific task without affecting the original model's performance on other tasks.

In some embodiments, one or more components of the system 100 discussed herein above may be configured to begin processing with respect to data as soon as the data or a portion of the data is available to the one or more components. Some components of the system 100 are generative components/models that can begin processing with respect to portions of data as they are available, instead of waiting to initiate processing after the entirety of data is available. In other words, the system 100 may be configured to stream portions of data associated with processing with respect to a user input to the one or more components such that the one or more components may begin performing their configured processing with respect to that data as soon as it is available to the one or more components. For example, if the output of the plan generation language model 420, the task selection language model 440, and/or the shortlister language model 540 indicates that additional information is needed to complete a first task associated with a user input, a request for the additional information may be sent to the personalized context component 165. Thereafter, the plan generation language model 420, the task selection language model 440, and/or the shortlister language model 540 may continue to process to complete their configured operations. For example, while the personalized context component 165 is processing to determine the additional information, the system 100 may begin processing with respect to a second task associated with the user input. Thereafter, the output of the personalized context component 165 may be sent to the response arbitration component 160 such that once the response arbitration component 160 receives the output of the LLM shortlister component 140, the response arbitration component 160 may resolve the ambiguity that resulted in the request for additional information in order to generate the responsive output data 162. For further example, if the user input data 127 is generated to include the natural language representation of the user input, but the processing required to determine the corresponding contextual signals (e.g., weather data, time of data, dialog history, device information, etc.) is yet to be completed, the plan generation component 135 may begin processing with respect to the natural language representation of the user input. Once the corresponding contextual signals have been generated, the plan generation component 135 may begin processing with respect to the contextual signals and may update downstream components with the result of the processing with respect to the contextual signals.

As another example, if the plan generation component 135 determines that more than one task is to be completed to perform an action responsive to a user input, and the LLM shortlister component 140 processes as described herein above to cause one or more components to generate potential responses with respect to a first task of the more than one tasks, the LLM shortlister component 140 may send the potential responses (and a representation of the user input and the current task) to the response arbitration component 160 to process as described herein above with respect to those potential responses while the system 100 (e.g., the plan generation component 135 and/or the LLM shortlister component 140) completes processing with respect to the remaining tasks of the one or more tasks. Therefore, the response arbitration component 160 may process as described herein to select between the potential responses associated with the first task while the potential responses associated with one or more of the remaining tasks is completed. As such, the response arbitration component 160 may only need to arbitrate between the potential responses associated with the first task that were previously selected by the response arbitration component 160 as being responsive to the first task when the response arbitration component 160 later processes with respect to further potential responses associated with further tasks.

As a further example, if the API shortlister component 520 determines (e.g., with a confidence value that meets or exceeds a particular threshold) that a particular API or API description should be included in the relevant API data, the API shortlister component 520 may provide the corresponding relevant API data to the shortlister prompt generation component 510 so that the shortlister prompt generation component 510 may begin processing with respect to the relevant API data while the API shortlister component 520 continues to determine one or more further relevant API data. In general, the system 100 is capable of performing such streaming and processing of portions of data discussed herein (e.g., for processing with respect to a user input) and updating downstream components with the results of processing of newly available portions of data as the data becomes available for processing.

Figure 6:
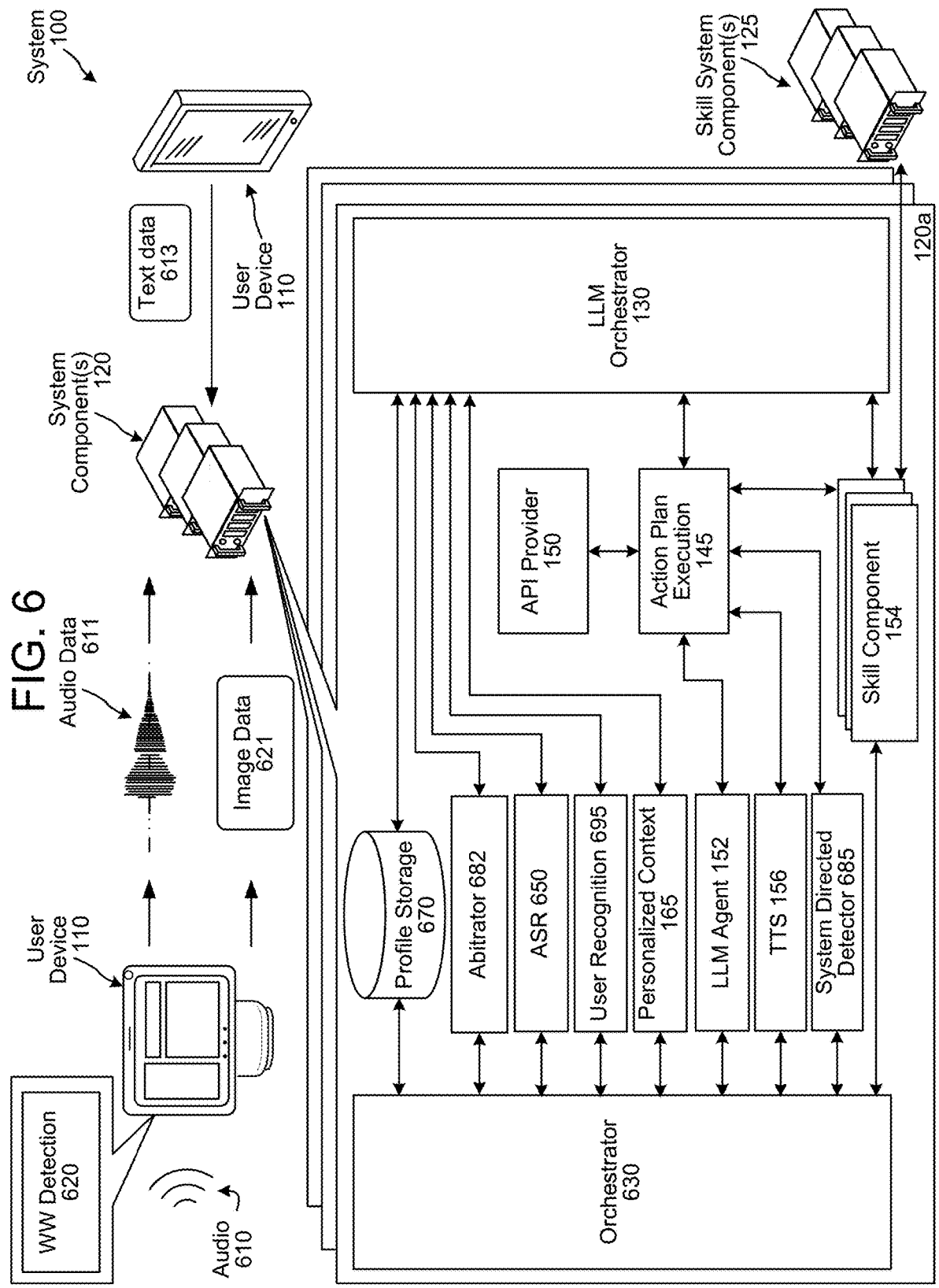
FIG. 6 is a conceptual diagram of components of the system, according to embodiments of the present disclosure.

The system 100 may operate using various components as described in FIG. 6. The various components may be located on same or different physical devices. Communication between various components may occur directly or across a network(s) 199. The user device 110 may include audio capture component(s), such as a microphone or array of microphones of a user device 110, captures audio 610 and creates corresponding audio data. Once speech is detected in audio data representing the audio 610, the user device 110 may determine if the speech is directed at the user device 110/system component(s). In at least some embodiments, such determination may be made using a wakeword detection component 620. The wakeword detection component 620 may be configured to detect various wakewords. In at least some examples, each wakeword may correspond to a name of a different digital assistant. An example wakeword/digital assistant name is "Alexa." In another example, input to the system may be in form of text data 613, for example as a result of a user typing an input into a user interface of user device 110. Other input forms may include indication that the user has pressed a physical or virtual button on user device 110, the user has made a gesture, etc. The user device 110 may also capture images using camera(s) 918 of the user device 110 and may send image data 621 representing those image(s) to the system component(s). The image data 621 may include raw image data or image data processed by the user device 110 before sending to the system component(s). The image data 621 may be used in various manners by different components of the system to perform operations such as determining whether a user is directing an utterance to the system, interpreting a user command, responding to a user command, etc.

The wakeword detection component 620 of the user device 110 may process the audio data, representing the audio 610, to determine whether speech is represented therein. The user device 110 may use various techniques to determine whether the audio data includes speech. In some examples, the user device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 610, is analyzed to determine if specific characteristics of the audio data match preconfigured acoustic waveforms, audio signatures, or other data corresponding to a wakeword.

Thus, the wakeword detection component 620 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 620 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 620 and/or input is detected by an input detector, the user device 110 may "wake" and begin transmitting audio data 611, representing the audio 610, to the system component(s) 120. The audio data 611 may include data corresponding to the wakeword; in other embodiments, the portion of the audio corresponding to the wakeword is removed by the user device 110 prior to sending the audio data 611 to the system component(s) 120. In the case of touch input detection or gesture based input detection, the audio data may not include a wakeword.

In some implementations, the system 100 may include more than one system component(s). The system component(s) 120 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 620 may result in sending audio data to system component(s) a for processing while detection of the wakeword "Computer" by the wakeword detector may result in sending audio data to system component(s) b for processing. The system may have a separate wakeword and system for different skills/systems (e.g., "Dungeon Master" for a game play skill/system component(s) c) and/or such skills/systems may be coordinated by one or more skill component(s) 154 of one or more system component(s) 120.

The user device 110 may also include a system directed input detector 885. (The system component(s) may also include a system directed input detector 685 which may operate in a manner similar to system directed input detector 885.) The system directed input detector 885 may be configured to determine whether an input to the system (for example speech, a gesture, etc.) is directed to the system or not directed to the system (for example directed to another user, etc.). The system directed input detector 885 may work in conjunction with the wakeword detection component 620. If the system directed input detector 885 determines an input is directed to the system, the user device 110 may "wake" and begin sending captured data for further processing (for example, processing audio data using the language processing 692/892, processing captured image data using image processing component 640/840 or the like). If data is being processed the user device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 885 determines an input is not directed to the system (such as a speech or gesture directed to another user) the user device 110 may discard the data and take no further action for processing purposes. In this way the system 100 may prevent processing of data not directed to the system, thus protecting user privacy. As an indicator to the user, however, the system may output an audio, visual, or other indicator when the system directed input detector 885 is determining whether an input is potentially device directed. For example, the system may output an orange indicator while considering an input, and may output a green indicator if a system directed input is detected. Other such configurations are possible.

Upon receipt by the system component(s) 120, the audio data 611 may be sent to an orchestrator component 630 and/or the LLM orchestrator component 130. The orchestrator component 630 may include memory and logic that enables the orchestrator component 630 to transmit various pieces and forms of data to various components of the system, as well as perform other operations as described herein. In some embodiments, the orchestrator component 630 may optionally be included in the system component(s) 120. In embodiments where the orchestrator component 630 is not included in the system component(s) 120, the audio data 611 may be sent directly to the LLM orchestrator component 130. Further, in such embodiments, each of the components of the system component(s) 120 may be configured to interact with the LLM orchestrator component 130, the action plan execution component 145, and/or the API provider component 150.

In some embodiments, the system component(s) 120 may include an arbitrator component 682, which may be configured to determine whether the orchestrator component 630 and/or the LLM orchestrator component 130 are to process with respect to the audio data 611. In some embodiments, the LLM orchestrator component 130 may be selected to process with respect to the audio data 611 only if the user 105 associated with the audio data 611 (or the user device 110 that captured the audio 610) has previously indicated that the LLM orchestrator component 130 may be selected to process with respect to user inputs received from the user 105.

In some embodiments, the arbitrator component 682 may determine the orchestrator component 630 and/or the LLM orchestrator component 130 are to process with respect to the audio data 611 based on metadata associated with the audio data 611. For example, the arbitrator component 682 may be a classifier configured to process a natural language representation of the audio data 611 (e.g., output by the ASR component 650) and classify the corresponding user input as to be processed by the orchestrator component 630 and/or the LLM orchestrator component 130. For further example, the arbitrator component 682 may determine whether the device from which the audio data 611 is received is associated with an indicator representing the audio data 611 is to be processed by the orchestrator component 630 and/or the LLM orchestrator component 130. As an even further example, the arbitrator component 682 may determine whether the user (e.g., determined using data output from the user recognition component 695) from which the audio data 611 is received is associated with a user profile including an indicator representing the audio data 611 is to be processed by the orchestrator component 630 and/or the LLM orchestrator component 130. As another example, the arbitrator component 682 may determine whether the audio data 611 (or the output of the ASR component 650) corresponds to a request representing that the audio data 611 is to be processed by the orchestrator component 630 and/or the LLM orchestrator component 130 (e.g., a request including "let's chat" may represent that the audio data 611 is to be processed by the LLM orchestrator component 130).

In some embodiments, if the arbitrator component 682 is unsure (e.g., a confidence score corresponding to whether the orchestrator component 630 and/or the LLM orchestrator component 130 is to process is below a threshold), then the arbitrator component 682 may send the audio data 611 to both of the orchestrator component 630 and the LLM orchestrator component 130. In such embodiments, the orchestrator component 630 and/or the LLM orchestrator component 130 may include further logic for determining further confidence scores during processing representing whether the orchestrator component 630 and/or the LLM orchestrator component 130 should continue processing, as is discussed further herein below.

The arbitrator component 682 may send the audio data 611 to an ASR component 650. In some embodiments, the component selected to process the audio data 611 (e.g., the orchestrator component 630 and/or the LLM orchestrator component 130) may send the audio data 611 to the ASR component 650. The ASR component 650 may transcribe the audio data 611 into text data. The text data output by the ASR component 650 represents one or more than one (e.g., in the form of an N-best list) ASR hypotheses representing speech represented in the audio data 611. The ASR component 650 interprets the speech in the audio data 611 based on a similarity between the audio data 611 and pre-established language models. For example, the ASR component 650 may compare the audio data 611 with models for sounds (e.g., acoustic units such as phonemes, senons, phones, etc.) and sequences of sounds to identify words that match the sequence of sounds of the speech represented in the audio data 611. The ASR component 650 sends the text data generated thereby to the arbitrator component 682, the orchestrator component 630, and/or the LLM orchestrator component 130. In instances where the text data is sent to the arbitrator component 682, the arbitrator component 682 may send the text data to the component selected to process the audio data 611 (e.g., the orchestrator component 630 and/or the LLM orchestrator component 130). The text data sent from the ASR component 650 to the arbitrator component 682, the orchestrator component 630, and/or the LLM orchestrator component 130 may include a single top-scoring ASR hypothesis or may include an N-best list including multiple top-scoring ASR hypotheses. An N-best list may additionally include a respective score associated with each ASR hypothesis represented therein.

Figure 7:
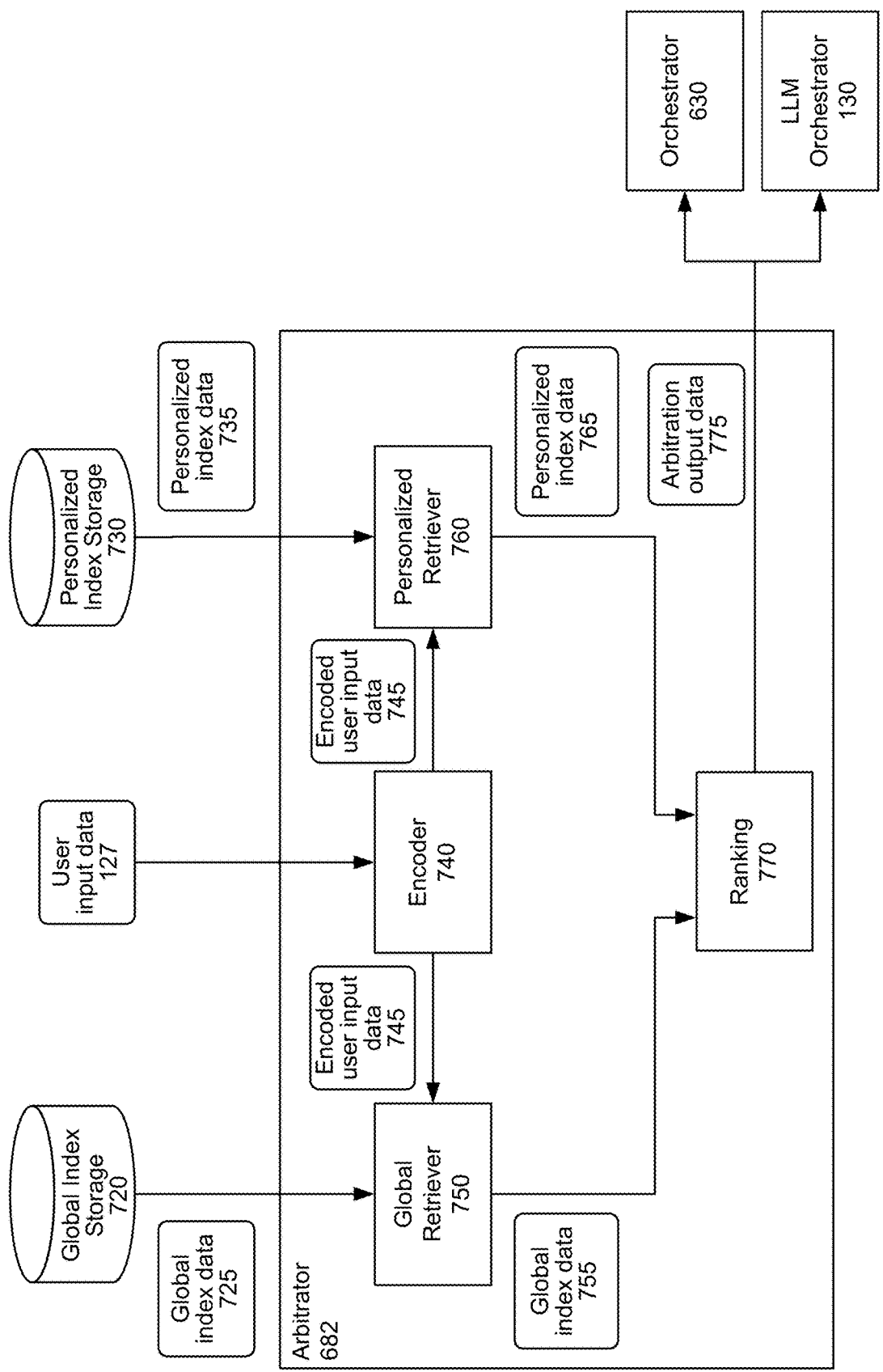
FIG. 7 is a conceptual diagram illustrating example processing of an arbitrator component, according to embodiments of the present disclosure.

FIG. 7 illustrates example components and processing of the arbitrator component 682. As shown in FIG. 7, the arbitrator component 682 may include an encoder component 740, a global retriever component 750, a personalized retriever component 760, and a ranking component 770. The arbitrator component 682 may be in communication with a global index storage 720 and a personalized index storage 730. The arbitrator component 682 may be configured to perform retrieval-based techniques based on a semantic vectorized representation of a user input and historical user inputs received by the system 100 over a period of time (e.g., past 30 days) to determine whether the orchestrator component 630 or the LLM orchestrator component 130 or both of them should process with respect to the user input.

The user input data 127 may be received at the encoder component 740 of the arbitrator component 682. The encoder component 740 may process the user input data 127 to generate encoded user input data 745 represented an encoded representation of the user input data 127 (e.g., a vectorized representation of the user input). The encoder component may send the encoded user input data 745 to the global retriever component 750 and the personalized retriever component 760. In some embodiments, the encoder component 740 may be trained using techniques associated with Deep Structured Semantic Models (DSSM).

The global retriever component 750 is configured to determine one or more historical user inputs that are similar to the user input data 127. The global retriever component 750 queries a global index storage 720 for global index data 725 representing one or more historical user inputs that are semantically similar to the user input data 127. The global retriever component 750 may include one or more historical user inputs received from various users over a period of time (e.g., 30 days). In some embodiments, the global index data 725 may correspond to an encoded representation(s) of the historical user input(s). In such embodiments, the one or more historical user inputs that are semantically similar to the user input data 127 may be determined based on comparing the encoded user input data 745 to the encoder representation(s) of the historical user input(s) (e.g., to determine a cosine similarity). The global retriever component 750 may send the global index data 725 to the ranking component 770.

The personalized retriever component 760 is configured to determine one or more historical user inputs that are similar to the user input data 127, where the one or more historical user inputs are associated with the user 105 that provided the user input corresponding to the user input data 127. The personalized retriever component 760 queries a personalized index storage 730 for personalized index data 735 representing one or more historical user inputs that are semantically similar to the user input data 127 and were provided by the same user that provided the user input corresponding to the user input data 127. The personalized retriever component 760 may include one or more historical user inputs received from the user corresponding to the user input data 127 over a period of time (e.g., 30 days). In some embodiments, the personalized index data 735 may correspond to an encoded representation(s) of the historical user input(s). In such embodiments, the one or more historical user inputs that are semantically similar to the user input data 127 may be determined based on comparing the encoded user input data 745 to the encoder representation(s) of the historical user input(s) (e.g., to determine a cosine similarity). The personalized retriever component 760 may send the personalized index data 735 to the ranking component 770.

In some embodiments, the global index storage 720 and/or the personalized index storage 730 may further include metadata associated with the historical user inputs, which may be further included in the global index data 725 and/or the personalized index data 735. For example, the global index storage 720 and/or the personalized index storage 730 may further include a user satisfaction associated with a system-generated response to the user input, a value representing how many times the user input was received during the time period, a domain (e.g., routine, smart home, shopping, weather, etc.), etc.

In some embodiments, the global retriever component 750 and/or the personalized retriever component 760 may retrieve the global index data 725 and/or the personalized index data 735 semantically similar to the encoded user input data 745 using Maximum Inner Product Search Solution.

The ranking component 770 may process the global index data 755 and the personalized index data 765 to determine whether to send the user input data 127 to the orchestrator component 630 and/or the LLM orchestrator component 130. In some embodiments, the ranking component 770 may make such a determination based on the metadata included in the global index data 755 and/or the personalized index data 765. In some embodiments, the ranking component 770 may be a rule-based component. In other embodiments, the ranking component 770 may be an ML-based component (e.g., a decision tree, a classifier, an LLM, etc.). In embodiments where the ranking component 770 is an LLM, the ranking component 770 may be further configured to determine if there the user input is ambiguous, in which case the ranking component 770 may generate a request for additional information to resolve the ambiguity.

In some embodiments, after determining that the orchestrator component 630 and/or the LLM orchestrator component 130 should process with respect to the user input data 127, the ranking component 770 may be configured to periodically determine whether the orchestrator component 630 and/or the LLM orchestrator component 130 should continue processing with respect to the user input data 127. For example, after a particular point in the processing of the orchestrator component 630 (e.g., after performing NLU, prior to determining a skill component 154 to process with respect to the user input data 127, prior to performing an action responsive to the user input, etc.) and/or the LLM orchestrator component 130 (e.g., after selecting a task to be completed, after receiving the action response data from the one or more components, after completing a task, prior to performing an action responsive to the user input, etc.) the orchestrator component 630 and/or the LLM orchestrator component 130 may query the arbitrator component 682 has determined that the orchestrator component 630 and/or the LLM orchestrator component 130 should halt processing with respect to the user input data 127. As discussed above, the system 100 may be configured to stream portions of data associated with processing with respect to a user input to the one or more components such that the one or more components may begin performing their configured processing with respect to that data as soon as it is available to the one or more components. As such, the arbitrator component 682 may cause the orchestrator component 630 and/or the LLM orchestrator component 130 to begin processing with respect to a user input as soon as a portion of data associated with the user input data 127 is available (e.g., the ASR data, context data, output of the user recognition component 695. Thereafter, once the arbitrator component 682 has enough data to perform the processing described herein above to determine whether the orchestrator component 630 and/or the LLM orchestrator component 130 is to process with respect to the user input, the arbitrator component 682 may inform the corresponding component (e.g., the orchestrator component 630 and/or the LLM orchestrator component 130) to continue/halt processing with respect to the user input at one of the logical checkpoints in the processing of the orchestrator component 630 and/or the LLM orchestrator component 130.

In some embodiments, the orchestrator component 630 and/or the LLM orchestrator component 130 may periodically confirm that they are to continue processing with respect to the user input. For example, the arbitrator component 682 may be further configured to periodically receive data generated by the orchestrator component 630 and/or the LLM orchestrator component 130 during processing with respect to the user input and determine whether the orchestrator component 630 and/or the LLM orchestrator component 130 should continue processing. The arbitrator component 682 may receive such data at logical checkpoints in the processing of the orchestrator component 630 (e.g., after completion of ASR processing, after completion of natural language understanding processing, after selection of a skill component to process with respect to the user input and prior to initiation of processing by the skill component, or prior to the processing of any component discussed herein with respect to the orchestrator component 630.) and/or the LLM orchestrator component 130 (e.g., prior to processing of the LLM shortlister component 140, prior to beginning processing with respect to a subsequent task, or prior to the processing of any other component discussed herein above with respect to the LLM orchestrator component 130). The arbitrator component 682 may be configured to process as described herein above to compare the received data to data associated with processing of a previous user input. This may allow the arbitrator component 682 to make a more informed determination (e.g., based on the additional data determined during processing of the orchestrator component 630 and/or the LLM orchestrator component 130) as to which component(s) should process the user input. In some embodiments, the data may be received at another component of the system 100 configured to process as described herein.

In some embodiments, after sending the data to the arbitrator component 682, the orchestrator component 630 and/or the LLM orchestrator component 130 may temporarily suspend processing with respect to the user input until they receive data from the arbitrator component 682 confirming that they are to continue processing with respect to the user input. As discussed above, in some embodiments, the LLM orchestrator component 130 may send the data to the arbitrator component 682 prior to the processing of the LLM shortlister component 140. In some embodiments, the LLM orchestrator component 130 may further include a component configured to process the task processing data output by the plan generation component 135 (e.g., the task processing data 137) to determine whether completion of the current task will result in a real-world action (e.g., a change in the state of a device, such as turning on a light, changing a channel on a television, changing a temperature value on a thermostat, locking a door, etc.). If the component determines that completion of the current task will result in a real-world action, then the LLM orchestrator component 130 may temporarily suspend its processing prior to the processing of the LLM shortlister component 140. If the component determines that completion of the current task will not result in a real-world action, then the LLM orchestrator component 130 may begin processing of the LLM shortlister component 140, rather than temporarily suspending processing. In some embodiments, the orchestrator component 630 may include a similarly configured component.

A skill system component(s) 125 may communicate with a skill component(s) 154 within the system component(s) 120 directly with the orchestrator component 630 and/or the action plan execution component 145, or with other components. A skill system component(s) 125 may be configured to perform one or more actions. An ability to perform such action(s) may sometimes be referred to as a "skill." That is, a skill may enable a skill system component(s) 125 to execute specific functionality in order to provide data or perform some other action requested by a user. For example, a weather service skill may enable a skill system component(s) 125 to provide weather information to the system component(s) 120, a car service skill may enable a skill system component(s) 125 to book a trip with respect to a taxi or ride sharing service, an order pizza skill may enable a skill system component(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 154 dedicated to interacting with the skill system component(s) 125. Unless expressly stated otherwise, reference to a skill, skill device, or skill component may include a skill component 154 operated by the system component(s) 120 and/or skill operated by the skill system component(s) 125. Moreover, the functionality described herein as a skill or skill may be referred to using many different terms, such as an action, bot, app, or the like. The skill component 154 and or skill system component(s) 125 may return output data to the orchestrator component 630.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) includes a TTS component 156. The TTS component 156 may generate audio data (e.g., synthesized speech) from text data using one or more different methods. Text data input to the TTS component 156 may come from a skill component 154, the orchestrator component 630, or another component of the system. In one method of synthesis called unit selection, the TTS component 156 matches text data against a database of recorded speech. The TTS component 156 selects matching units of recorded speech and concatenates the units together to form audio data. In another method of synthesis called parametric synthesis, the TTS component 156 varies parameters such as frequency, volume, and noise to create audio data including an artificial speech waveform. Parametric synthesis uses a computerized voice generator, sometimes called a vocoder.

The user device 110 may include still image and/or video capture components such as a camera or cameras to capture one or more images. The user device 110 may include circuitry for digitizing the images and/or video for transmission to the system component(s) 120 as image data. The user device 110 may further include circuitry for voice command-based control of the camera, allowing a user 105 to request capture of image or video data. The user device 110 may process the commands locally or send audio data 611 representing the commands to the system component(s) 120 for processing, after which the system component(s) 120 may return output data that can cause the user device 110 to engage its camera.

The system component(s) 120 may include a user recognition component 695 that recognizes one or more users using a variety of data. However, the disclosure is not limited thereto, and the user device 110 may include a user recognition component 895 instead of and/or in addition to user recognition component 695 of the system component(s) 120 without departing from the disclosure. User recognition component 895 operates similarly to user recognition component 695.

The user recognition component 695 may take as input the audio data 611 and/or text data output by the ASR component 650. The user recognition component 695 may perform user recognition by comparing audio characteristics in the audio data 611 to stored audio characteristics of users. The user recognition component 695 may also perform user recognition by comparing biometric data (e.g., fingerprint data, iris data, etc.), received by the system in correlation with the present user input, to stored biometric data of users assuming user permission and previous authorization. The user recognition component 695 may further perform user recognition by comparing image data (e.g., including a representation of at least a feature of a user), received by the system in correlation with the present user input, with stored image data including representations of features of different users. The user recognition component 695 may perform additional user recognition processes, including those known in the art.

The user recognition component 695 determines scores indicating whether user input originated from a particular user. For example, a first score may indicate a likelihood that the user input originated from a first user, a second score may indicate a likelihood that the user input originated from a second user, etc. The user recognition component 695 also determines an overall confidence regarding the accuracy of user recognition operations.

Output of the user recognition component 695 may include a single user identifier corresponding to the most likely user that originated the user input. Alternatively, output of the user recognition component 695 may include an N-best list of user identifiers with respective scores indicating likelihoods of respective users originating the user input. The output of the user recognition component 695 may be used to inform processing of the arbitrator component 682, the orchestrator component 630, and/or the LLM orchestrator component 130 as well as processing performed by other components of the system.

The system component(s) 120/user device 110 may include a presence detection component that determines the presence and/or location of one or more users using a variety of data.

The system 100 (either on user device 110, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 670 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 110, the user profile (associated with the presented login information) may be updated to include information about the user device 110, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 670 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 670 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 8:
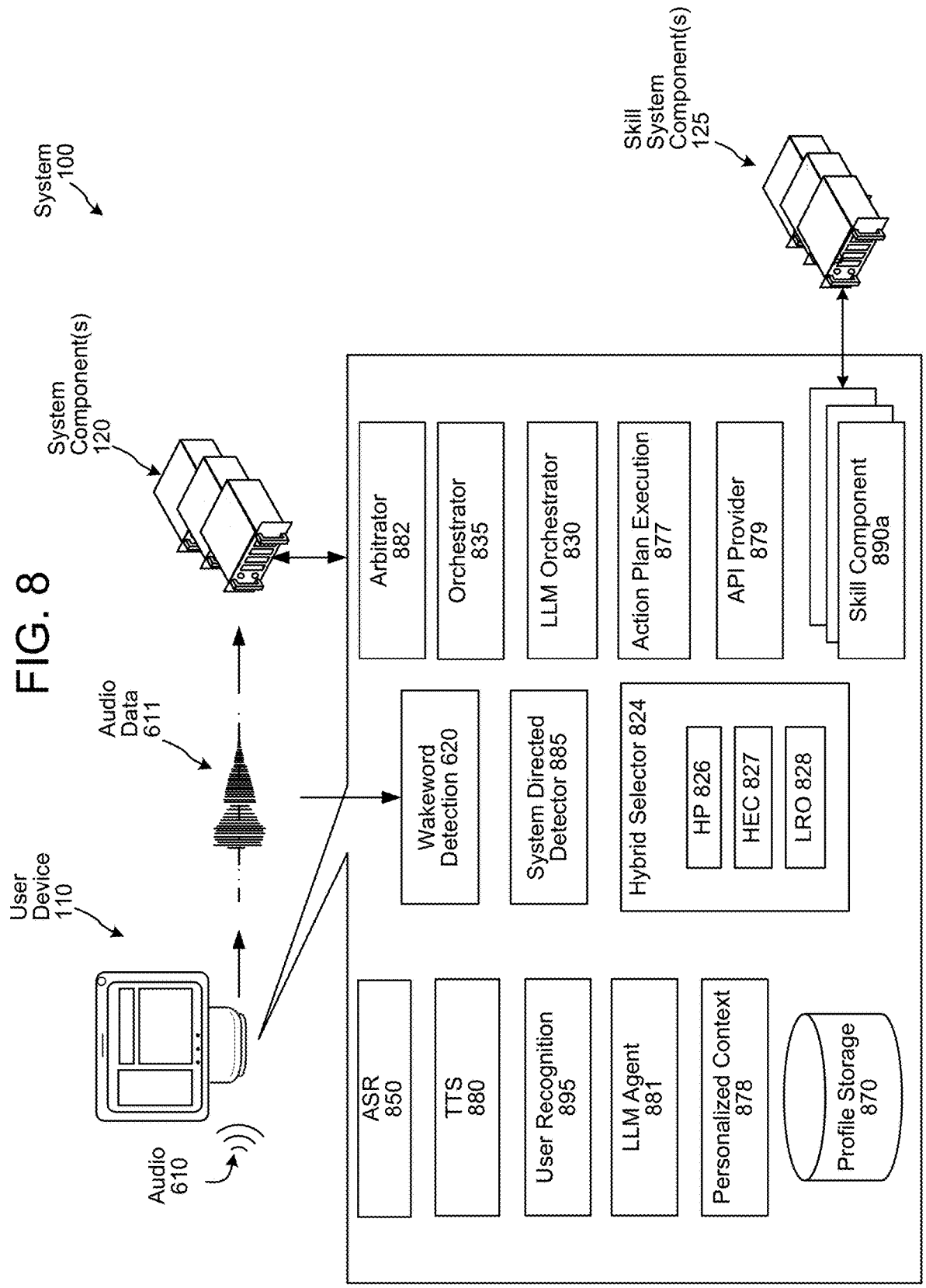
FIG. 8 is a conceptual diagram illustrating components that may be included in a device, according to embodiments of the present disclosure.

Although the components of FIG. 6 may be illustrated as part of system component(s) 120, user device 110, or otherwise, the components may be arranged in other device(s) (such as in user device 110 if illustrated in system component(s) 120 or vice-versa, or in other device(s) altogether) without departing from the disclosure. FIG. 8 illustrates such a configured user device 110.

In at least some embodiments, the system component(s) may receive the audio data 611 from the user device 110, to recognize speech corresponding to a spoken input in the received audio data 611, and to perform functions in response to the recognized speech. In at least some embodiments, these functions involve sending directives (e.g., commands), from the system component(s) to the user device 110 (and/or other devices 110) to cause the user device 110 to perform an action, such as output an audible response to the spoken input via a loudspeaker(s), and/or control secondary devices in the environment by sending a control command to the secondary devices.

Thus, when the user device 110 is able to communicate with the system component(s) over the network(s) 199, some or all of the functions capable of being performed by the system component(s) may be performed by sending one or more directives over the network(s) 199 to the user device 110, which, in turn, may process the directive(s) and perform one or more corresponding actions. For example, the system component(s), using a remote directive that is included in response data (e.g., a remote response), may instruct the user device 110 to output an audible response (e.g., using TTS processing performed by an on-device TTS component 880) to a user's question via a loudspeaker(s) of (or otherwise associated with) the user device 110, to output content (e.g., music) via the loudspeaker(s) of (or otherwise associated with) the user device 110, to display content on a display of (or otherwise associated with) the user device 110, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., a video call) between the user 105 and another user, and so on.

As noted with respect to FIG. 6, the user device 110 may include a wakeword detection component 620 configured to compare the audio data 611 to stored models used to detect a wakeword (e.g., "Alexa") that indicates to the user device 110 that the audio data 611 is to be processed by the user device 110 (e.g., by the orchestrator component 835 and/or the LLM orchestrator 830, which are configured similar to the orchestrator component 630 and the LLM orchestrator component 130, respectively). In at least some embodiments, a hybrid selector 824, of the user device 110, may send the audio data 611 to the wakeword detection component 620. If the wakeword detection component 620 detects a wakeword in the audio data 611, the wakeword detection component 620 may send an indication of such detection to the hybrid selector 824. In response to receiving the indication, the hybrid selector 824 may send the audio data 611 to the system component(s) and/or the ASR component 850. The wakeword detection component 620 may also send an indication, to the hybrid selector 824, representing a wakeword was not detected. In response to receiving such an indication, the hybrid selector 824 may refrain from sending the audio data 611 to the system component(s), and may prevent the ASR component 850 from further processing the audio data 611. In this situation, the audio data 611 can be discarded.

The user device 110 may conduct its own speech processing using on-device language processing components, such as an ASR component 850, similar to the manner discussed herein with respect to the ASR component 650 of the system component(s). ASR component 850 may operate similarly to ASR component 650. The user device 110 may also internally include, or otherwise have access to, other components such as one or more skill components 890 capable of executing commands based on the output of the orchestrator component 835, the LLM orchestrator 830, or other results determined by the user device 110/system component(s) (which may operate similarly to skill components 154), an arbitrator component 882 (configured to process in a similar manner to that discussed herein above with respect to the arbitrator component 682), an action plan execution component 877 (configured to process in a similar manner to that discussed herein with respect to the action plan execution component 145), a personalized context component 878 (configured to process in a similar manner to that discussed herein with respect to the personalized context component 165) an API provider component 879 (configured to process in a similar manner to that discussed herein with respect to the API provider component 150), and LLM agent component 881 (configured to process in a similar manner to that discussed herein with respect to the LLM agent component 152), a user recognition component 895 (configured to process in a similar manner to that discussed herein with respect to the user recognition component 695 of the system component(s)), profile storage 870 (configured to store similar profile data to that discussed herein with respect to the profile storage 670 of the system component(s)), or other components. In at least some embodiments, the profile storage 870 may only store profile data for a user or group of users specifically associated with the user device 110. Similar to as described above with respect to skill component 154, a skill component 890 may communicate with a skill system component(s) 125. The user device 110 may also have its own TTS component 880, which may operate similarly to TTS component 156.

In at least some embodiments, the on-device language processing components may not have the same capabilities as the language processing components of the system component(s). For example, the on-device language processing components may be configured to handle only a subset of the natural language user inputs that may be handled by the system component(s). For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s). If the user device 110 attempts to process a natural language user input for which the on-device language processing components are not necessarily best suited, the language processing results determined by the user device 110 may indicate a low confidence or other metric indicating that the processing by the user device 110 may not be as accurate as the processing done by the system component(s).

The hybrid selector 824, of the user device 110, may include a hybrid proxy (HP) 826 configured to proxy traffic to/from the system component(s). For example, the HP 826 may be configured to send messages to/from a hybrid execution controller (HEC) 827 of the hybrid selector 824. For example, command/directive data received from the system component(s) can be sent to the HEC 827 using the HP 826. The HP 826 may also be configured to allow the audio data 611 to pass to the system component(s) while also receiving (e.g., intercepting) this audio data 611 and sending the audio data 611 to the HEC 827.

In at least some embodiments, the hybrid selector 824 may further include a local request orchestrator (LRO) 828 configured to notify the ASR component 850 about the availability of new audio data 611 that represents user speech, and to otherwise initiate the operations of local language processing when new audio data 611 becomes available. In general, the hybrid selector 824 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 110 receives directive data from the system component(s) and chooses to use that remotely-determined directive data.

Thus, when the audio data 611 is received, the HP 826 may allow the audio data 611 to pass through to the system component(s) and the HP 826 may also input the audio data 611 to the on-device ASR component 850 by routing the audio data 611 through the HEC 827 of the hybrid selector 824, whereby the LRO 828 notifies the ASR component 850 of the audio data 611. At this point, the hybrid selector 824 may wait for response data from either or both of the system component(s) or the local language processing components. However, the disclosure is not limited thereto, and in some examples the hybrid selector 824 may send the audio data 611 only to the local ASR component 850 without departing from the disclosure. For example, the user device 110 may process the audio data 611 locally without sending the audio data 611 to the system component(s).

The local ASR component 850 is configured to receive the audio data 611 from the hybrid selector 824, and to recognize speech in the audio data 611. The user device 110 and/or the system component(s) may associate a unique identifier with each natural language user input. The user device 110 may include the unique identifier when sending the audio data 611 to the system component(s), and the response data from the system component(s) may include the unique identifier to identify which natural language user input the response data corresponds.

In at least some embodiments, the user device 110 may include, or be configured to use, one or more skill components 890 that may work similarly to the skill component(s) 154 implemented by the system component(s). The skill component(s) 890 may correspond to one or more domains that are used in order to determine how to act on a spoken input in a particular way, such as by outputting a directive that corresponds to the determined intent, and which can be processed to implement the desired operation. The skill component(s) 890 installed on the user device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device 110 may be in communication with one or more skill system component(s) 125. For example, a skill system component(s) 125 may be located in a remote environment (e.g., separate location) such that the user device 110 may only communicate with the skill system component(s) 125 via the network(s) 199. However, the disclosure is not limited thereto. For example, in at least some embodiments, a skill system component(s) 125 may be configured in a local environment (e.g., home server and/or the like) such that the user device 110 may communicate with the skill system component(s) 125 via a private network, such as a local area network (LAN).

As used herein, a "skill" may refer to a skill component 890, a skill system component(s) 125, or a combination of a skill component 890 and a corresponding skill system component(s) 125.

Similar to the manner discussed with regard to FIG. 6, the local user device 110 may be configured to recognize multiple different wakewords and/or perform different categories of tasks depending on the wakeword. Such different wakewords may invoke different processing components of local user device 110 (not illustrated in FIG. 8). For example, detection of the wakeword "Alexa" by the wakeword detection component 620 may result in sending audio data to certain language processing components 892/skill components 890 for processing while detection of the wakeword "Computer" by the wakeword detector may result in sending audio data different language processing components 892/skill components 890 for processing.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 9:
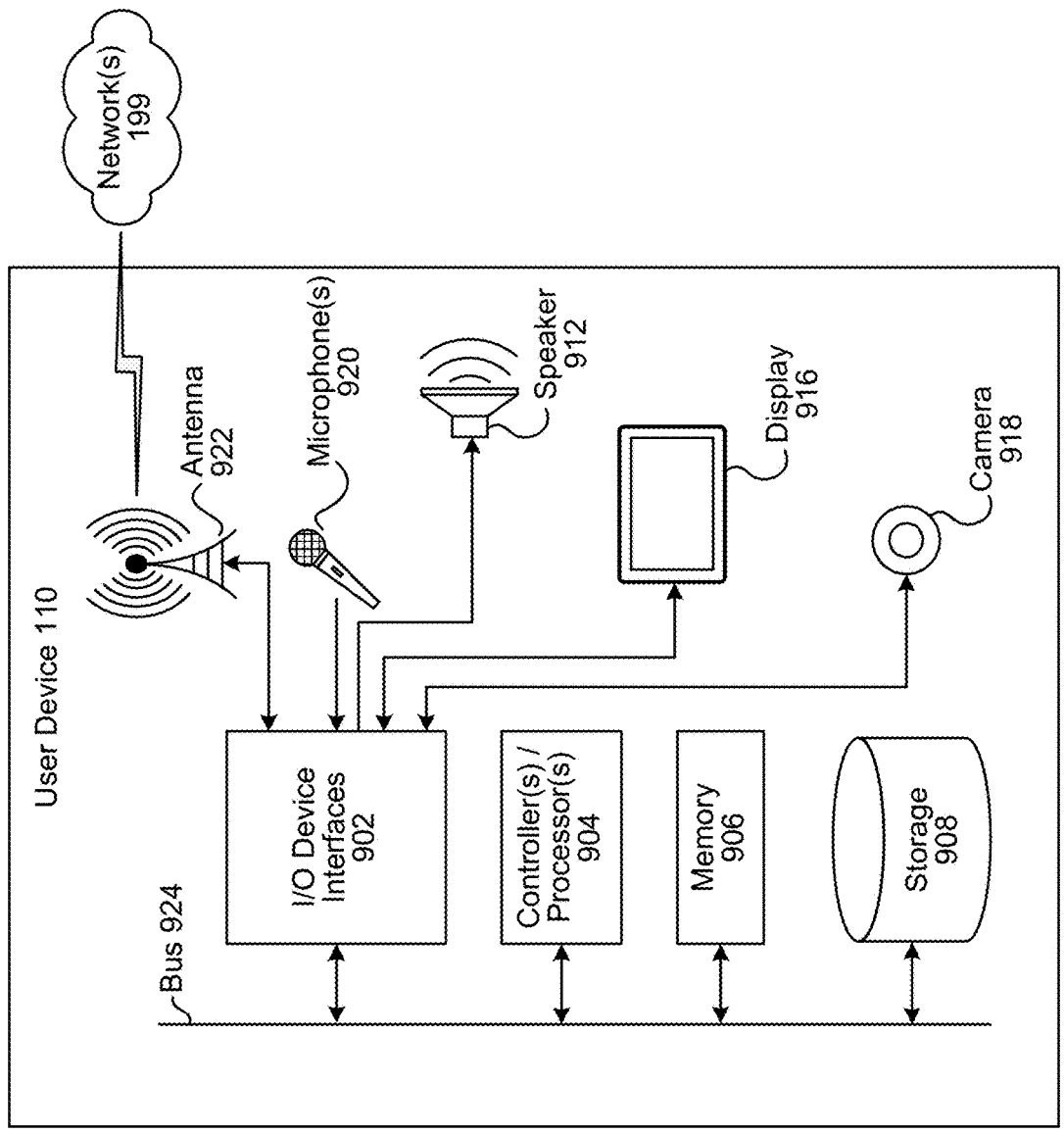
FIG. 9 is a block diagram conceptually illustrating example components of a device, according to embodiments of the present disclosure.
Figure 10:
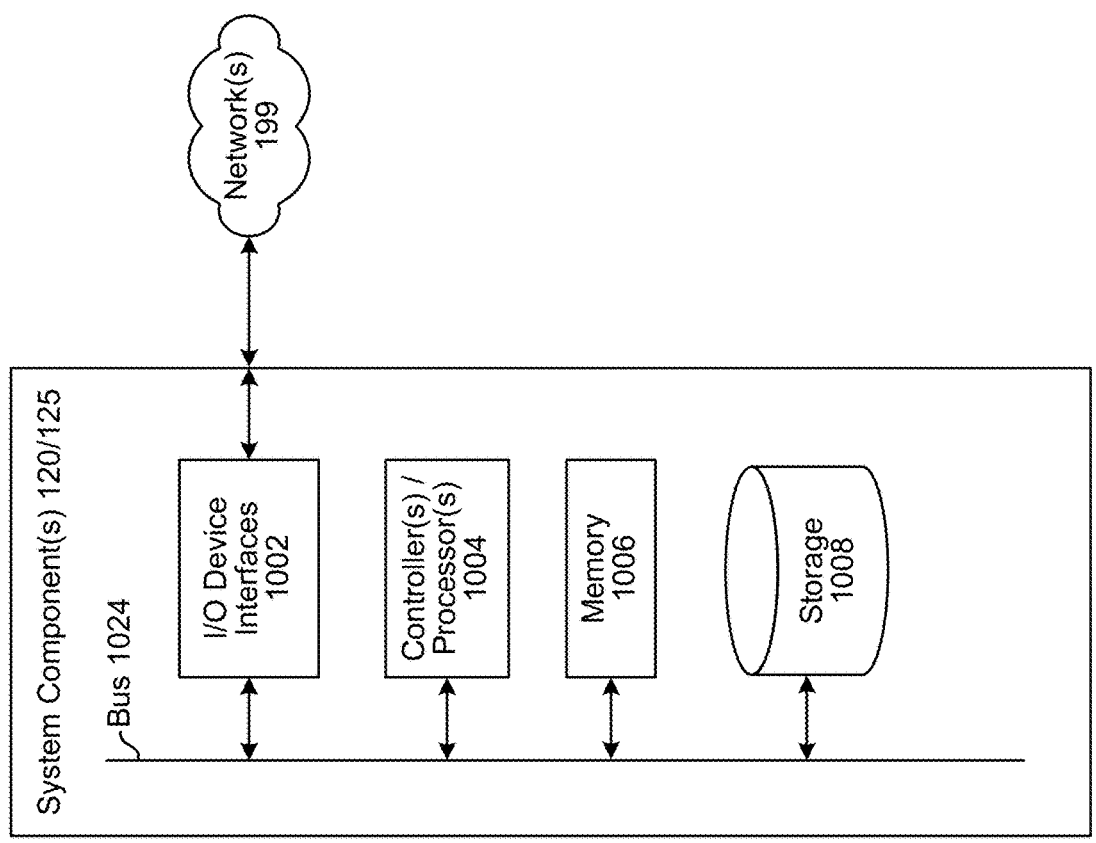
FIG. 10 is a block diagram conceptually illustrating example components of a system, according to embodiments of the present disclosure.

FIG. 9 is a block diagram conceptually illustrating a user device 110 that may be used with the system. FIG. 10 is a block diagram conceptually illustrating example components of a remote device, such as the natural language command processing system component(s), which may assist with ASR processing, NLU processing, etc., and a skill system component(s) 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user device 110 may operate locally to a user (e.g., within a same environment so the device may receive inputs and playback outputs for the user) the server/system component(s) may be located remotely from the user device 110 as its operations may not require proximity to the user. The server/system component(s) may be located in an entirely different location from the user device 110 (for example, as part of a cloud computing system or the like) or may be located in a same environment as the user device 110 but physically separated therefrom (for example a home server or similar device that resides in a user's home or business but perhaps in a closet, basement, attic, or the like). The system component(s) 120 may also be a version of a user device 110 that includes different (e.g., more) processing capabilities than other user device(s) 110 in a home/office. One benefit to the server/system component(s) being in a user's home/business is that data used to process a command/return a response may be kept within the user's home, thus reducing potential privacy concerns.

Multiple system components (120/125) may be included in the overall system 100 of the present disclosure, such as one or more natural language processing system component(s) 120 for performing ASR processing, one or more natural language processing system component(s) 120 for performing NLU processing, one or more skill system component(s) 125, etc. In operation, each of these systems may include computer-readable and computer-executable instructions that reside on the respective device (120/125), as will be discussed further below.

Each of these devices (110/120/125) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/125) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (902/1002).

Computer instructions for operating each device (110/120/125) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/125) includes input/output device interfaces (902/1002). A variety of components may be connected through the input/output device interfaces (902/1002), as will be discussed further below. Additionally, each device (110/120/125) may include an address/data bus (924/1024) for conveying data among components of the respective device. Each component within a device (110/120/125) may also be directly connected to other components in addition to (or instead of) being connected to other components across the bus (924/1024).

Referring to FIG. 9, the user device 110 may include input/output device interfaces 902 that connect to a variety of components such as an audio output component such as a speaker 912, a wired headset or a wireless headset (not illustrated), or other component capable of outputting audio. The user device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 110 may additionally include a display 916 for displaying content. The user device 110 may further include a camera 918.

Via antenna(s) 922, the input/output device interfaces 902 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device(s) 110, the natural language command processing system component(s), or a skill system component(s) 125 may include their own dedicated processors, memory, and/or storage. Alternatively, one or more of the components of the device(s) 110, the natural language command processing system component(s), or a skill system component(s) 125 may utilize the I/O interfaces (902/1002), processor(s) (904/1004), memory (906/1006), and/or storage (908/1008) of the device(s) 110, natural language command processing system component(s), or the skill system component(s) 125, respectively. Thus, the ASR component 650 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 110, the natural language command processing system component(s), and a skill system component(s) 125, as described herein, are illustrative, and may be located as a stand-alone device or may be included, in whole or in part, as a component of a larger device or system. As can be appreciated, a number of components may exist either on a system component(s) and/or on user device 110. For example, language processing 692/892 (which may include ASR 650/850), language output 693/893 (which may include NLG 679/879 and TTS 680/880), etc., for example as illustrated in FIGS. 6 and 8. Unless expressly noted otherwise, the system version of such components may operate similarly to the device version of such components and thus the description of one version (e.g., the system version or the local version) applies to the description of the other version (e.g., the local version or system version) and vice-versa.

Figure 11:
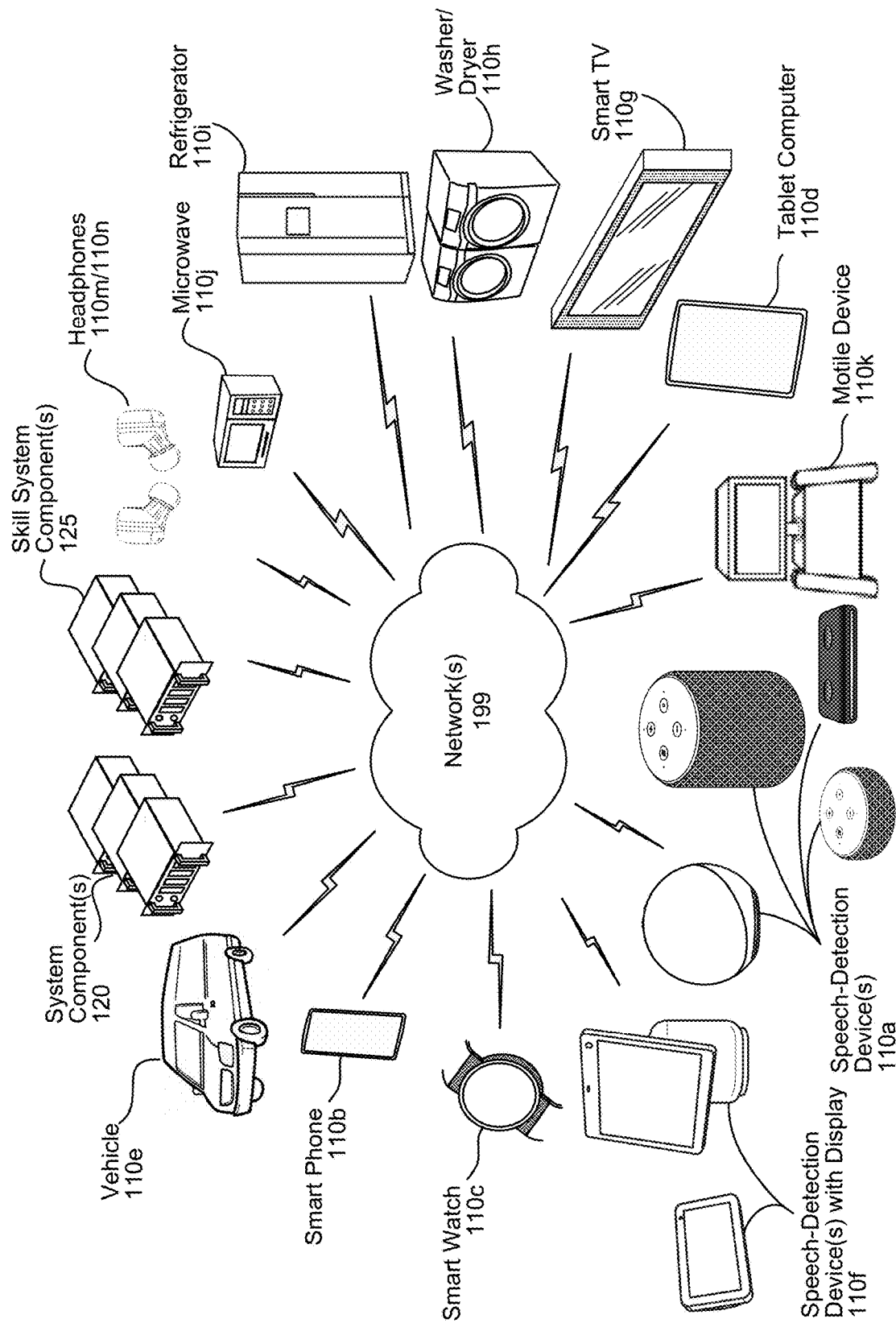
FIG. 11 illustrates an example of a computer network for use with the overall system, according to embodiments of the present disclosure.

As illustrated in FIG. 11, multiple devices (110*a*-110*n*, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110*a*, a smart phone 110*b*, a smart watch 110*c*, a tablet computer 110*d*, a vehicle 110*e*, a speech-detection device with display 110*f*, a display/smart television 110*g*, a washer/dryer 110*h*, a refrigerator 110*i*, a microwave 110*j*, autonomously motile device 110*k* (e.g., a robot), etc., may be connected to the network(s) 199 through a wireless service provider, over a Wi-Fi or cellular network connection, or the like. Other devices are included as network-connected support devices, such as the natural language command processing system component(s) 120, the skill system component(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 650, etc. of the natural language command processing system component(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving first audio data corresponding to a first spoken input;
   performing automatic speech recognition (ASR) processing using the first audio data to generate a first transcript of the first spoken input;
   receiving first potential response data from a first component configured to perform a first action associated with the first spoken input;
   receiving second potential response data from a second component configured to perform a second action associated with the first spoken input;
   receiving third potential response data from a third component configured to perform the second action;
   generating a first prompt including the first potential response data, the second potential response data, the third potential response data, and the first transcript, wherein the first prompt is a first request for a language model to determine a first output responsive to the first spoken input;
   processing, using the language model, the first prompt to generate first model output data indicating:
      the first potential response data is responsive to the first spoken input, and
      the second potential response data is responsive to the first spoken input;
   based at least in part on the first model output data, causing the first component to perform the first action; and
   based at least in part on the first model output data, causing the second component to perform the second action.

2. The computer-implemented method of claim 1, further comprising:
   receiving second audio data corresponding to a second spoken input;
   performing ASR processing using the second audio data to generate a second transcript of the second spoken input;
   receiving fourth potential response data from a fourth component, the fourth potential response data associated with the second spoken input;
   receiving fifth potential response data from a fifth component, the fifth potential response data associated with the second spoken input;
   generating a second prompt including the fourth potential response data, the fifth potential response data, and the second transcript, wherein the second prompt is a second request for the language model to determine a second output responsive to the first spoken input;
   processing, using the language model, the second prompt to generate second model output data indicating:

the fourth potential response data is responsive to the second spoken input, and the fifth potential response data is responsive to the second spoken input, wherein the second model output data includes second output data representing a summary of the fourth potential response data and the fifth potential response data; and causing presentation of the second output data in response to the second spoken input.

3. The computer-implemented method of claim 1, wherein the first potential response data is associated with a first task of the first spoken input, the second potential response data and the third potential response data are associated with a second task of the first spoken input, and the method further comprises:

prior to receiving the second potential response data and the third potential response data, receiving fourth potential response data from a fourth component configured to perform a fourth action associated with the first spoken input, wherein the fourth potential response data is associated with the first task;

generating a second prompt including the first potential response data, the fourth potential response data, and the first transcript, wherein the second prompt is a second request for the language model to determine a second output responsive to the first task of the first spoken input; and processing, using the language model, the second prompt to generate second model output data indicating the first potential response data is responsive to the first task of the first spoken input, instead of the fourth potential response data.

4. The computer-implemented method of claim 1, further comprising:

prior to generating the first prompt, generating a second prompt including the first potential response data, the second potential response data, the third potential response data, and the first transcript, wherein the second prompt is a second request for the language model to determine a second output responsive to the first spoken input;

processing, using the language model, the second prompt to generate second model output data including:
an indication of an ambiguity associated with the first spoken input, and
a third request for first data associated with the ambiguity;

based at least in part on the second model output data, sending, to a fourth component, the second model output data; and receiving, from the fourth component, first context data associated with the ambiguity, wherein:
the first prompt further includes the first context data, and
the first model output data is unassociated with the ambiguity.

5. A computer-implemented method comprising:
receiving first input data;
receiving first potential response data from a first component configured to perform a first action associated with the first input data;
receiving second potential response data corresponding to a second component configured to perform a second action associated with the first input data;
determining a first prompt including the first potential response data, the second potential response data, the first input data, wherein the first prompt is a first request for a language model to determine a first output responsive to the first input data;

processing, using the language model, the first prompt to generate first model output data indicating the first action is responsive to the first input data; and causing the first component to perform the first action.

6. The computer-implemented method of claim 5, further comprising:
receiving second input data;
receiving third potential response data from a third component, the third potential response data associated with the second input data;
receiving fourth potential response data from a fourth component, the fourth potential response data associated with the second input data;
generating a second prompt including the third potential response data, the fourth potential response data, and the second input data, wherein the second prompt is a second request for the language model to determine a second output responsive to the second input data;
processing, using the language model, the second prompt to generate second model output data indicating:
the third potential response data is responsive to the second input data, and
the fourth potential response data is responsive to the second input data, wherein the second model output data includes second output data representing a summary of the third potential response data and the fourth potential response data; and
causing presentation of the second output data in response to the second input data.

7. The computer-implemented method of claim 5, wherein the first potential response data is associated with a first task of the first input data, the second potential response data is associated with a second task of the first input data, and the method further comprises:

prior to receiving the second potential response data, receiving third potential response data corresponding to a third component configured to perform a third action associated with the first input data, wherein the third potential response data is associated with the first task;

determining a second prompt including the first potential response data and the third potential response data, wherein the second prompt is a second request for the language model to determine a second output responsive to the first task of the first input data; and processing, using the language model, the second prompt to generate second model output data indicating the first potential response data is responsive to the first task of the first input data, instead of the third potential response data.

8. The computer-implemented method of claim 5, further comprising:

prior to generating the first prompt, generating a second prompt including the first potential response data, the second potential response data, and the first input data, wherein the second prompt is a second request for the language model to determine a second output responsive to the first input data;

processing, using the language model, the second prompt to generate second model output data including:
an indication of an ambiguity associated with the first input data, and
a third request for first data associated with the ambiguity;

based at least in part on the second model output data, sending, to a third component, the second model output data; and receiving, from the third component, first context data associated with the ambiguity, wherein:

the first prompt further includes the first context data, and the first model output data is unassociated with the ambiguity.

9. The computer-implemented method of claim 5, wherein the first action corresponds to a first device performing a third action, and the method further comprises:

determining first output data corresponding to the first action, the first output data indicating performance of the first action by the first device; and after causing the first component to perform the first action, causing presentation of the first output data.

10. The computer-implemented method of claim 5, wherein the first action corresponds to a first device performing a third action, and the method further comprises:

receiving third potential response data corresponding to a third component configured to perform a fourth action associated with the first input data, wherein:

the fourth action corresponds to a second device performing a fifth action, the first prompt further includes the third potential response data, and the first model output data further indicates that the fourth action is responsive to the first input data; and causing the third component to perform the fourth action, wherein:

causing the third component to perform the fourth action includes causing the second device to perform the fifth action, and causing the first component to perform the first action includes causing the first device to perform the third action.

11. The computer-implemented method of claim 5, further comprising:

prior to generating the first prompt, generating a second prompt including the first potential response data, the second potential response data, and the first input data, wherein the second prompt is a second request for the language model to determine a second output responsive to the first input data;

processing, using the language model, the second prompt to generate second model output data including:

an indication of an ambiguity associated with the first input data, and a third request for context data associated with the ambiguity;

based at least in part on the second model output data, determining second output data corresponding to the second model output data;

causing presentation of the second output data; and receiving natural language data corresponding to a user input associated with the ambiguity, wherein:

the first prompt further includes the user input, and the first model output data is unassociated with the ambiguity.

12. The computer-implemented method of claim 5, wherein the first component is a skill and the second component is a large language model (LLM) based agent.

13. A computing system comprising:

at least one processor; and at least one memory including instructions that, when executed by the at least one processor, cause the computing system to:

receive first input data;

receive first potential response data from a first component configured to perform a first action associated with the first input data;

receive second potential response data corresponding to a second component configured to perform a second action associated with the first input data;

determine a first prompt including the first potential response data, the second potential response data, the first input data, wherein the first prompt is a first request for a language model to determine a first output responsive to the first input data;

process, using the language model, the first prompt to generate first model output data indicating the first action is responsive to the first input data; and cause the first component to perform the first action.

14. The computing system of claim 13, wherein the at least one memory further comprises instructions that, when executed by the at least one processor, further cause the computing system to:

receive second input data;

receive third potential response data from a third component, the third potential response data associated with the second input data;

receive fourth potential response data from a fourth component, the fourth potential response data associated with the second input data;

generate a second prompt including the third potential response data, the fourth potential response data, and the second input data, wherein the second prompt is a second request for the language model to determine a second output responsive to the second input data;

process, using the language model, the second prompt to generate second model output data indicating:

the third potential response data is responsive to the second input data, and the fourth potential response data is responsive to the second input data, wherein the second model output data includes second output data representing a summary of the third potential response data and the fourth potential response data; and cause presentation of the second output data in response to the second input data.

15. The computing system of claim 13, wherein the first potential response data is associated with a first task of the first input data, the second potential response data is associated with a second task of the first input data, and wherein the at least one memory further comprises instructions that, when executed by the at least one processor, further cause the computing system to:

prior to receiving the second potential response data, receive third potential response data corresponding to a third component configured to perform a third action associated with the first input data, wherein the third potential response data is associated with the first task;

determine a second prompt including the first potential response data and the third potential response data, wherein the second prompt is a second request for the language model to determine a second output responsive to the first task of the first input data; and process, using the language model, the second prompt to generate second model output data indicating the first potential response data is responsive to the first task of the first input data, instead of the third potential response data.

16. The computing system of claim 13, wherein the at least one memory further comprises instructions that, when executed by the at least one processor, further cause the computing system to:
prior to generating the first prompt, generate a second prompt including the first potential response data, the second potential response data, and the first input data, wherein the second prompt is a second request for the language model to determine a second output responsive to the first input data;
process, using the language model, the second prompt to generate second model output data including:
an indication of an ambiguity associated with the first input data, and
a third request for first data associated with the ambiguity;
based at least in part on the second model output data, send, to a third component, the second model output data; and
receive, from the third component, first context data associated with the ambiguity, wherein:
the first prompt further includes the first context data, and
the first model output data is unassociated with the ambiguity.

17. The computing system of claim 13, wherein the first action corresponds to a first device performing a third action, and wherein the at least one memory further comprises instructions that, when executed by the at least one processor, further cause the computing system to:
determine first output data corresponding to the first action, the first output data indicating performance of the first action by the first device; and
after causing the first component to perform the first action, cause presentation of the first output data.

18. The computing system of claim 13, wherein the first action corresponds to a first device performing a third action, and wherein the at least one memory further comprises instructions that, when executed by the at least one processor, further cause the computing system to:
receive third potential response data corresponding to a third component configured to perform a fourth action associated with the first input data, wherein:
the fourth action corresponds to a second device performing a fifth action,
the first prompt further includes the third potential response data, and
the first model output data further indicates that the fourth action is responsive to the first input data; and
cause the third component to perform the fourth action, wherein:
causing the third component to perform the fourth action includes causing the second device to perform the fifth action, and
causing the first component to perform the first action includes causing the first device to perform the third action.

19. The computing system of claim 13, wherein the at least one memory further comprises instructions that, when executed by the at least one processor, further cause the computing system to:
prior to generating the first prompt, generate a second prompt including the first potential response data, the second potential response data, and the first input data, wherein the second prompt is a second request for the language model to determine a second output responsive to the first input data;
process, using the language model, the second prompt to generate second model output data including:
an indication of an ambiguity associated with the first input data, and
a third request for context data associated with the ambiguity;
based at least in part on the second model output data, determine second output data corresponding to the second model output data;
cause presentation of the second output data; and
receive natural language data corresponding to a user input associated with the ambiguity, wherein:
the first prompt further includes the user input, and
the first model output data is unassociated with the ambiguity.

20. The computing system of claim 13, wherein the first component is a skill and the second component is a large language model (LLM) based agent.

* * * * *